(12) United States Patent
Ganesan et al.

(10) Patent No.: US 7,502,749 B2
(45) Date of Patent: Mar. 10, 2009

(54) METHOD AND SYSTEM FOR MAKING A MONETARY GIFT

(75) Inventors: Ravi Ganesan, Norcross, GA (US); Timothy Scott Renshaw, Cumming, GA (US); Peter Kight, Alpharetta, GA (US)

(73) Assignee: CheckFree Corporation, Dublin, OH (US)

( * ) Notice: Subject to any disclaimer, the term of this patent is extended or adjusted under 35 U.S.C. 154(b) by 1337 days.

(21) Appl. No.: 09/849,979

(22) Filed: May 8, 2001

(65) Prior Publication Data

US 2002/0087427 A1    Jul. 4, 2002

Related U.S. Application Data

(63) Continuation of application No. 09/749,596, filed on Dec. 28, 2000.

(51) Int. Cl.
  G06Q 17/30     (2006.01)
  G06F 17/30     (2006.01)
(52) U.S. Cl. .......................................... 705/26; 705/27
(58) Field of Classification Search ............... 705/26, 705/27
  See application file for complete search history.

(56) References Cited

U.S. PATENT DOCUMENTS

| | | |
|---|---|---|
| 4,823,264 A | 4/1989 | Deming |
| 5,025,373 A | 6/1991 | Keyser, Jr. et al. |
| 5,220,501 A | 6/1993 | Lawlor et al. |
| 5,283,829 A | 2/1994 | Anderson |
| 5,326,959 A | 7/1994 | Perazza |
| 5,336,870 A | 8/1994 | Hughes et al. |
| 5,383,113 A | 1/1995 | Kight et al. |
| 5,420,405 A | 5/1995 | Chasek |
| 5,465,206 A | 11/1995 | Hilt et al. |
| 5,504,677 A | 4/1996 | Pollin |
| 5,555,496 A * | 9/1996 | Tackbary et al. ............ 345/810 |
| 5,677,955 A | 10/1997 | Doggett et al. |
| 5,699,528 A | 12/1997 | Hogan |
| 5,710,889 A | 1/1998 | Clark et al. |
| 5,727,249 A | 3/1998 | Pollin |

(Continued)

FOREIGN PATENT DOCUMENTS

JP    02002041909 A  *  2/2002

OTHER PUBLICATIONS

Lenhart, J. "'Happy Holidays,' High-Tech Style; Sending Cards Over the Internet Gains Popularity," The Washington Post (Dec. 20, 1998).*

(Continued)

Primary Examiner—Jeffrey A. Smith
Assistant Examiner—Michael A. Misiaszek
(74) Attorney, Agent, or Firm—Sutherland Asbill & Brennan, LLP

(57) ABSTRACT

A method, system and article of manufacture for making a monetary gift. The system includes a communications port, a memory, and a processor. The processor functions to perform the method of the present invention. A request to make a monetary gift to a recipient on behalf of a donor is received. An input associated with an electronic greeting card is also received. The request and the input are processed to generate the electronic greeting card with a notification of the gift. The electronic greeting card is transmitted to the recipient, and the gift is credited to the recipient's bank account.

30 Claims, 36 Drawing Sheets

U.S. PATENT DOCUMENTS

| | | | |
|---|---|---|---|
| 5,794,221 A | | 8/1998 | Egendorf |
| 5,870,718 A | * | 2/1999 | Spector ........................ 235/381 |
| 5,873,072 A | | 2/1999 | Kight et al. |
| 5,884,288 A | | 3/1999 | Chang et al. |
| 5,920,847 A | | 7/1999 | Kolling et al. |
| 5,920,848 A | | 7/1999 | Schutzer et al. |
| 5,966,698 A | | 10/1999 | Pollin |
| 5,974,146 A | | 10/1999 | Randle et al. |
| 5,978,780 A | | 11/1999 | Watson |
| 5,984,180 A | * | 11/1999 | Albrecht ...................... 235/380 |
| 6,029,150 A | | 2/2000 | Kravitz |
| 6,032,133 A | | 2/2000 | Hilt et al. |
| 6,098,053 A | | 8/2000 | Slater |
| 6,138,106 A | * | 10/2000 | Walker et al. ............... 235/381 |
| 6,173,269 B1 | * | 1/2001 | Solokl et al. .................. 705/35 |
| 6,175,823 B1 | * | 1/2001 | Van Dusen ................... 705/14 |
| 6,188,994 B1 | | 2/2001 | Egendorf |
| 6,240,397 B1 | * | 5/2001 | Sachs ........................... 705/14 |
| 6,288,319 B1 | * | 9/2001 | Catona ..................... 40/124.03 |
| 6,311,170 B1 | | 10/2001 | Embrey |
| 2001/0037295 A1 | | 11/2001 | Olsen |

OTHER PUBLICATIONS

"WishClick Kicks Off Marketing Campaign by Tempting Consumers With Tell-a-Friend Promotion; Register with WishClick and receive up to $50 in SuperCertificates from GiftCertificates.com," Business Wire (Nov. 2, 1999).*

"Sparks.com, Web's Largest Greeting Card Store, has Perfect Greeting for the Holidays; With Huge Selection, Online Retailer Carriers More Cards Than Ten Drugstores," Business Wire (Dec. 10, 1998).*

"Card wars result in some bitter messages," Financial Times (Dec. 28, 1998).*

"Iconomy Lands Agreement with Lucidity; Provides Lucidity with Gifts for Outline Shoppers," Business Wire (Dec. 22, 1999).*

Greenberg, I. "A fistful of Floonz," U.S. News & World Report, vol. 126, on. 17 (May 3, 1999).*

GiveAnything.com, Nov. 27, 1999 [retrieved May 29, 2002] <URL:www.giveanything.com>.*

Giftpro.com, Dec. 3, 1998 [retrieved May 29, 2002] <URL:www.giftpro.com>.*

Hansell, S. "Electronic Checks to Pay Bills Over the Computer," The New York Times (Aug. 27, 1995).*

"Person-To-anywhere Payments are Here With Citibank's C2it" Credit Card News (Nov. 15, 2000).*

"You've Got Money!" Bank Technology News (Jun. 2000) vol. 13, No. 6, p. 1.*

* cited by examiner

METHOD AND SYSTEM FOR MAKING A MONETARY GIFT

This application is a continuation of pending application Ser. No. 09/749,596 filed on Dec. 28, 2000.

TECHNICAL FIELD

The present invention relates generally to electronic funds movement and more particularly to delivery of electronic greeting cards with funds attached.

BACKGROUND ART

Over the past several years an international network of networks known as the Internet has become increasingly popular. The Internet allows millions of users throughout the world to communicate with each other. To provide users with easier access to information available on the Internet, a World Wide Web has been established. The World Wide Web allows information to be organized, searched and presented on the Internet using hypertext. Thus, using the World Wide Web a user can submit a query for information and be linked electronically to information of interest which has been stored at Web locations on the Internet. Using hypertext, a user can also communicate information to other users of the Internet. Because of the use of hypertext, the information which can be queried and retrieved via the Internet includes not only textual information but also information in graphic, audio and video form. Web search engines and browsers have been developed to make searching and retrieval of information of interest on the Web a simple task. Hence, the Web has made it relatively easy for virtually anyone having access to a personal computer or other device connected to the Internet to communicate with others who are also connected to the network. This ease of use has resulted in an increase in the number of users utilizing the Internet.

With the proliferation of Internet users, numerous services are now provided over the Internet. One of the first such services to be offered was electronic banking. Electronic banking allows banking customers to access their account information and execute banking transactions, e.g. the transfer of funds from a savings to a checking account, by simply linking to a bank server using the Internet to access account information and communicate transfer instructions.

Electronic banking has advanced from this basic consumer-to-bank communication to a consumer being able to electronically pay bills and make other payment types and fund transfers to others by communicating instructions, via the Internet, to a service provider possibly distinct from the financial institute maintaining deposited or credited funds of a pre-registered payer. The payments are then made to the payee by the service provider. The term "payment" as used herein can include payment of bills as well as other payments not based upon bills. Funds from the payer's deposit or credit account, i.e. the payer's payment account, are debited by the service provider to cover the payment. The payment by the service provider to the payee can be made in any number of ways.

For example, the service provider may electronically transfer funds from the payer's banking account to the payee's banking account, may electronically transfer funds from a service provider's banking account, to the payee's banking account, may prepare a paper draft or check on the service provider's banking account and mail it to the payee, may prepare an electronically printed paper draft on the payer's banking account and mail it to the payee, or may make a wire transfer from either the service provider's banking account or the payer's banking account.

If the funds transferred to the payee are drawn from the service provider's banking account, funds from the payer's banking account are electronically or otherwise transferred to the service provider's banking account to cover the payment. Further, if the payment will be made from funds in the service provider's banking account, the payment will preferably be consolidated with payments being made to the same payee on behalf of other payers.

Accordingly, such electronic payment systems eliminate the need for a payer to write or print paper checks and then forward them by mail to the payee. This makes it easier and more efficient for the payer to make payments. Payees receiving consolidated payments no longer have to deal with checks from each payee and therefore can process payments more efficiently. The making of payments by the electronic or wire transfer of funds provides even further efficiencies in payment processing by payees, and it is well recognized that making payments electronically can significantly reduce the cost of processing payments for both the payer and the payee.

A payer must be a registered user of conventional electronic payment systems. Registration is required so that the service provider can obtain and validate information relating the user. Registration may be a somewhat simplified process whereby a user submits, on-line, information identifying his or her bank account and financial institution and his or her name, address and phone number, or some variation thereof. Other systems require that the potential user supply a voided check from the user's checking account. However, even with the simplified on-line registration process, the payer is not able to immediately direct payments. The user must wait for the service provider to validate the registration information and to receive a confirmation that the registration process is complete. This confirmation is typically sent from the service provider to the registering user via regular mail channels. Due to the processing and delivery time, the registering user is not able to immediately direct bill payment.

Accordingly, a need exists for a payment technique whereby a user may register and direct payments in a single on-line session.

In conventional electronic payment systems payment requests are processed before payment is released to reduce potential financial risk to the service provider. U.S. Pat. No. 5,383,113, to Kight et al., and assigned to the assignee of the present application, is directed to an electronic bill payment system and method. Processing a bill payment request, as disclosed in Kight, can include a risk analysis of the payment request before the payment is executed. This risk analysis can include determining in what form to release payment to the payee. Possible forms of payment are check, draft, or electronic funds transfer. The form of payment is based upon such criteria as analyzing the payment request to determine if the amount of the payment request meets or exceeds a first predetermined amount and determining if the total amount of previous payment requests within a certain timeframe meets or exceeds a second predetermined amount. The first and second predetermined amounts can be different amounts. The risk analysis can also include sending an inquiry to, and receiving a response from, a financial institution to determine availability of funds in the payer's account. The Kight patent utilizes both paper and electronic fund transfer. The risk processing in the Kight patent rests at least in part upon a decision between moving funds electronically or via less efficient paper means.

Accordingly, a need exists for a technique in which a payment request is timely and efficiently processed and executed, yet the service provider is protected from financial risk.

Merchants have begun to exploit the Internet's capabilities in their marketing of goods and services, i.e. products. Numerous merchants have now established virtual storefronts using a hypertext document, commonly referred to as a Web homepage, which users can access over the Internet. The merchant's homepage will typically provide information regarding products, and will often provide the prospective customer with the option to purchase a desired product by making the necessary selections and providing the necessary information to the merchant via the Internet. Hence, the Web offers a new and exciting channel for marketing goods and services, providing merchants with direct access to millions of potential buyers throughout the world in a manner which has never before been possible.

In order to ensure payment for products and services ordered over the Internet, merchants have typically offered the purchaser the ability to pay using credit or debit cards. Such cards are now widely used throughout the world to make purchases without cash. Credit cards basically extend a payment credit to the credit card holder. Debit cards, on the other hand, basically provide a means for debiting the cardholder's deposit account funds held by an issuing financial institute. As in traditional brick-and-mortar businesses, Web-based businesses typically pay a premium to financial institutions to be able to offer payment via credit and/or debit cards.

Also, individual sellers and purchasers have been brought together via the Internet. Sellers advertise goods for sale in a variety of sites on the Internet, and otherwise. These include personal homepages and public electronic bulletin boards. These individual sellers usually do not have the resources to accept payment via credit or debit cards. As discussed above, there is a cost associated with these transactions which makes it economically unfeasible for individuals to accept payment via these methods. Furthermore, these sellers usually do not have the technical expertise to maintain a homepage capable of accepting credit or debit card payments. As such, an individual purchaser typically pays an individual seller by check or money order. When payment is by check or money order, the seller must divulge to the purchaser his or her address. For payments by money order, the purchaser must purchase a money order and mail the money order to the seller. Thus, the period between the agreement to purchase and the receipt of the funds associated with the sale is dependent upon the time it takes to obtain a money order and deliver it to the seller. For payments made by check, in addition to the delivery time, the purchaser must reveals his or her personal information contained on the body of the check to the seller. Also, the seller is not assured that the check will be honored by the financial institution upon which it is drawn.

The latest development in bringing buyers and sellers together over the Internet are Web sites designed as auctions. Auctions are the newest, most convenient way to buy and sell things over the Internet. The auctions are typically hosted by Web sites which exclusively offer auctions or Internet portal sites which offer an array of services, though other types of Web sites also offer auctions. These sites offering Internet auctions will collectively be referred to as Auction Service Providers. These Auction Service Providers have created an on-line arena where users can register and become buyers or sellers in the auction. On-line auctions work similarly to standard auctions where the sellers have a particular item they would like to sell to the highest bidder. Typically an auction time frame is established that may span a few days to a few weeks to allow buyers an opportunity to place a bid. Bidding typically accelerates toward the end of the auction or bidding period. If a seller offers an item for auction and a bid is made, the seller is typically obligated to complete the transaction. Buyers may not retract a bid once it has been placed. The Auction Service Providers are creating a forum for this type of trading, but are not typically involved in the transaction between the buyer and seller.

Once bidding is over, the buyer is obligated to contact the seller within a designated number of days from the close of the auction, to discuss how to handle the shipping and payment for the merchandise. Buyers and sellers are both asked to register and to accept agreements to comply with the standard guidelines provided by the Auction Service Provider.

Registration information is required for both the buyers and sellers of the auctions. The registrations ensure that both parties have provided the necessary information to allow contact with each other when it is time to conduct a transaction. Contact information usually contains a name and a mailing address.

Some providers require each participant to reply to a confirmation e-mail in order to verify the information and that they have supplied a valid e-mail address. A user identification may also be used to allow the service provider to keep individual e-mail addresses private. In some cases a notification e-mail is sent to both buyer and seller to supply each with the other's e-mail address. Typically, contact should be made between both parties within 2 or 3 business days. Guidelines vary, but usually if the seller is able to contact the buyer within an agreed upon timeframe, that seller may then conduct his transaction with the next highest bidder.

Usually, the winning buyer at the auction site receives an e-mail from the service provider telling him that he has placed the winning bid and that he needs to contact the seller to finish the transaction. Or, this notification may be made via conventional postal delivery. Once contact has been made between the buyer and the seller, each must agree upon the terms of the transaction. They may agree that the buyer makes payment first, and then the seller may ship the item once payment has cleared. The seller may also agree to ship the item COD to the buyer. The Auction Service Provider is not usually involved in these directions, as they have merely provided an environment that facilitates the buying and selling of merchandise.

There are usually some standard payment methods suggested by the Auction Service Provider to the buyers and sellers. Typical payment methods are credit cards, money orders and checks drawn on buyers' accounts. If the parties to the transaction agree on a credit card or debit card payment, the service provider may act as a processing intermediary for the transaction.

Many individuals, whether purchasing goods and services from merchants or individuals via the Internet, or from an Internet auction site, do not wish to use debit or credit cards, or send banking account numbers over the Internet due to security concerns. This is because the Internet is an open communication network with virtually no built-in security.

Various techniques have been proposed for overcoming the reluctance on the part of potential purchasers to transmit their card numbers or account numbers over the Internet. Many of the proposed techniques rely on cryptography. Using these techniques, credit and debit card numbers are encrypted prior to transmission over the Internet to the seller and decrypted prior to storage at the merchant's Web site. These techniques may well alleviate concerns regarding the vulnerability of sensitive account information during transmission over the Internet. However, there remains a concern that, because the decrypted credit or debit card account numbers are stored on merchant computers, e.g. Web servers, connected to the Internet, this information will continue to be susceptible to attach by hackers and others who may attempt to gain unauthorized access to the information from virtually anywhere in the world. Although firewalls and other security measures can be taken to protect the stored information from unauthorized intruders, many merchants have neither the resources nor the expertise to implement such measures. Hence, encrypted transmission alone does not eliminate the security concern of many cardholders.

Others have proposed establishing what might be termed "virtual cash" which can be transferred from a purchaser's computer to a seller's computer to pay for a product or service bought via the Internet. The seller can then go to the "virtual cash" sponsor and exchange the "virtual cash" for actual cash. However, these techniques require the establishment of a new electronic monetary system and are reliant upon the financial worthiness of the "virtual cash" sponsor.

Still other proposed techniques utilize a type of "virtual cash," which is associated with a purchaser's banking account at a financial institute. Using such a system the buyer transfers the "virtual cash" along with its banking account number to the merchant as payment for the purchased products. The merchant then transfers the "virtual cash" to the financial institute, at which the purchaser maintains the deposit account. The financial institute then debits the purchaser's banking account by the amount represented by the "virtual cash" transferred to the seller and pays the seller using the funds withdrawn from the purchaser's banking account. These latter techniques have many of the same problems associated with the use of credit and debit cards. That is, the banking account number must be transmitted over the Internet and stored at the seller's Web site, and accordingly may be susceptible to unauthorized access.

Potential purchasers of goods and services over the Internet have also raised concerns regarding the transfer of credit card, debit card and deposit account numbers, as well as the transfer of "virtual cash" payments to merchants/sellers which have little history or trade presence. In this regard, potential purchasers may have a valid concern a Web merchant/seller is nothing more than a front for fraudulently obtaining credit card account numbers, debit card account numbers, deposit account numbers and/or virtual cash from unsuspecting purchasers.

Techniques have additionally been proposed to provide a separate private network for transmission of sensitive account related information. These techniques do provide an extra measure of security, but are disadvantageous in that an auxiliary communication network is required and the potential purchaser is forced to first divert his or her attention from the merchant's/seller's Web site, connect with a separate network, and to then go back to the merchant's/seller's Web site to conclude the transaction.

As discussed, many consumers are unwilling to use debit or credit cards, or transmit their banking account numbers, over the Internet, especially to unknown merchants/sellers. In the context of an individual seller, some buyers do not feel comfortable divulging personal information such as banking account numbers to strangers. Furthermore, some consumers do not have access to debit or credit cards, but do have banking accounts. As such, whether unwilling to use debit or credit cards via the Internet, or unable to use debit or credit cards, these consumers have not had the means to make purchases via the Internet.

Accordingly, a need exists for a technique to purchase goods and services via the Internet with funds from a purchaser's banking account without divulging personal information relating to purchasers and sellers via a network.

In transactions between individuals and brick-and-mortar stores there are well known procedures for a customer to return unacceptable merchandise. Also, the goods or services offered by the brick-and-mortar stores are typically immediately available to the purchaser. For Internet based transactions, the seller must ship goods to the purchaser, or perform services for the purchaser at a later time than execution of the transaction. Some Internet based business have procedures in place for return of unacceptable goods, but the purchaser must rely in good faith that the unacceptable goods will be accepted back by the business. However, in Internet transactions between individuals, no such procedures exist. Thus, purchasers have to rely on the good faith of sellers that the goods or services are as represented. Additionally, purchasers have to rely in good faith that sellers will deliver the purchased goods and/or services. Likewise, sellers must rely upon good faith that sellers will make prompt payment, and that that payment will be "good." This applies to transactions between individuals in both on-line auction and non-auction transactions.

A proposed solution to this dual problem exists. There are middlemen with a presence on the Internet who will accept both the sale payment from the purchaser and the goods from the seller. These middlemen verify the exchange. That is, they verify that goods are actually provided by the seller, and that funds are actually obtained from the purchaser, and then release the goods to the purchaser and the funds to the seller. However, oftentimes these middlemen are not in a position to judge the quality of the merchandise. For example, the merchandise may be a rare collectible with which a middleman may be unfamiliar. Also, this proposed solution adds extra shipping costs to the transaction. Instead of the goods being shipped from the seller to the purchaser, the goods must first be shipped from the seller to a middleman, and then from a middleman to the purchaser.

Accordingly, a need exists for an efficient technique which ensures that a purchaser receives what he bargained for, including a guaranteed return if the goods are not acceptable, and that the seller will be paid for delivered goods and services.

Another difficulty with Internet based purchases is that the purchaser has no way to know if the seller has actually shipped the goods, or performed the services. The purchaser who has paid for a product must wait for delivery of the goods, or performance of the services.

Accordingly, a need exists for a technique whereby a purchaser can be informed of the delivery or performance status of the purchase.

Yet another service now provided over the Internet is the delivery of electronic greeting cards via e-mail. Many Web sites offer such services. Electronic greeting cards are available for a myriad of occasions, as are paper greeting cards. However, electronic greeting cards have at least one disadvantage compared traditional paper greeting cards. Many senders include monetary gifts along with paper greeting cards. These gifts are typically in the form of cash, check, or gift certificate. With present electronic greeting cards, there is no way to include such a monetary gift.

Accordingly, a need exists for a technique for a donor to send a monetary gift payment via e-mail to a recipient.

OBJECTIVES OF THE INVENTION

Accordingly, it is an objective of the present invention to provide a technique in which a payment request is timely and efficiently processed, yet a provider of a payment service is protected from financial risk.

It is another objective of the present invention to provide a technique to protect both purchasers and sellers in electronic commerce transactions.

It is another objective of the present invention to provide a technique whereby a purchaser is aware of the delivery status of goods, or performance status of services, purchased via a network.

It is yet another objective of the present invention to provide a technique whereby the parties to a transaction can retain anonymity.

It is yet another objective of the present invention to provide a technique whereby funds can be donated via a network.

It is yet another objective of the present invention to provide a technique whereby a party may register for and utilize the services of an electronic payment service in a single on-line session.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention provides a method for making a monetary gift and a system and article of manufacture for implementing the method. The system includes at least a communications port for transmitting and receiving information via a network, a memory for storing information, and a processor. The processor functions to perform the method of the present invention and may be any type processor, such as that commonly utilized in a personal computer, high powered workstation, or sophisticated mainframe computer. The memory may be any type of memory capable of storing data, including, but not limited to, random access memory, floppy or hard magnetic disk, or optical disk. Data stored in the memory and data processed by the processor are exchanged between the processor and the memory. Also, data can be exchanged between different types of memory as needed. The communications port communicates with one or more networks configured to transmit electronic or optical data. Transmission of data may be by any commonly used method, including wireless communication. The networks can include a public or private telephone network, the Internet, a private banking network, or any other type network.

The data stored in the memory includes data associated with monetary gifts. Data associated with monetary gifts may include, and is not limited to, information identifying intended recipients, information identifying donors, and monetary gift amounts.

The processor receives, via the communications port, a request to make a monetary gift on behalf of a donor. The processor also causes the memory to store the request. The request may be received via e-mail, a web page, or some other form of network messaging. The donor, as well as the recipient, may be an individual, a business, or other organization with access to the network.

The processor also receives input associated with an electronic greeting card. An electronic greeting card is well known in the art and is commonly referred to as an e-card. An e-card is an electronic version of a paper greeting card delivered to a recipient via a network and presented to the recipient, typically via a display, though presentation can be via a printer. Delivery via a network may be via an e-mail message, via a web page, or via some other network messaging protocol. The received input can include selection of a particular e-card and a message to include in the e-card. The input can also include a partially generated e-card. The input can be received at the same time that the request is received, before the request is received, or after the request is received. The input and the request can both be received directly from the donor or from a party other than the donor, such as an Internet portal site, sponsor site, or electronic greeting card service. Or, the request can be received directly from the donor, and the input can be received from another party, such as an electronic greeting card service.

The processor processes the request and the input to generate the electronic greeting card including a notification of the monetary gift. The notification informs the recipient of the monetary gift. This enables a donor to give a monetary gift with an electronic greeting card, much like a monetary gift in the form of cash or a check can be included with a paper greeting card. The created electronic greeting card with notification can be a single message such that notification is included in the presentation of the e-card. The created electronic greeting card with notification can also be multiple messages delivered together such that notification is presented separately from presentation of the electronic greeting card. Notification, no matter if presented together or separate from presentation of the e-card, can include various information, including the amount of the monetary gift, the identity of the donor, personalized text specified by the donor, and other information. It should be understood that this information does not include information associated with any financial account belonging to the donor, unless the donor directs that such information be included. Further, it should be understood that any information associated with the donor and included in the notification is controlled by the donor. Thus, the notification may not include any information identifying the donor if so directed by the donor. As such, the donor may remain anonymous.

The processor causes the electronic greeting card to be transmitted to the recipient. This may be a direct transmission such that the processor causes the communications port to transmit the electronic greeting to the recipient. Or, the processor may cause the communications port to transmit the electronic greeting card to an entity other than the recipient. From the other entity, the electronic greeting card is then transmitted to the recipient.

The processor also causes funds equal to the monetary gift amount to be credited to a deposit account associated with the recipient. This may be done at any time prior to, concurrent with, or subsequent to the transmission of the electronic greeting card to the recipient. If done before or concurrent with the transmission, it will be appreciated that the recipient need take no action to receive the funds. Also, advantageously, if done subsequent to the transmission, the recipient may or may not need to take some action to receive the funds. A deposit account is an account such as a checking account or savings account maintained at a financial institution such as a bank or credit union. Preferably, the processor causes the funds to be credited to the deposit account by initiating an electronic credit to the recipient's deposit account, such as a credit via the ACH network. Alternatively, the electronic credit could be made via some other network, or via some other method not involving a network. Also, the processor could cause the funds to be credited to the recipient's account by directing that a check or draft, payable to the recipient, be printed and delivered to either the recipient or a financial institution at which the recipient's deposit account is maintained. No matter the form the credit is made to the recipient's deposit account, it should be understood that the funds may be used by the recipient as the recipient desires. The funds are not required to be utilized for any particular purpose or in any particular manner, including making purchases via the network, or making purchases from specified merchants.

According to one beneficial aspect of the invention, the processor causes the electronic greeting card to be transmitted to the recipient at one of a time subsequent to or concurrent with causing funds to be credited to the deposit account associated with the recipient. As discussed above, the recipient need not perform any action to receive the funds in either case.

According to another aspect of the invention, the notification includes a hyper-link. In this aspect of the invention, the funds are credited to the deposit account associated with the recipient subsequent to an activation of the hyper-link. Thus, the funds are not credited to the recipient's account until the recipient receives the electronic greeting card. The processor is further configured to receive, via the communications port, information indicating an activation of the hyper-link. The funds may be credited to the recipient's deposit account automatically upon receipt of information indicating activation of the hyper-link, or one or more other actions may be required subsequent to activation of the hyper-link before the funds will be credited. These may be actions performed by one or both of the recipient and the processor.

According to yet another aspect of the invention, the processor receives, via the activated hyper-link, information identifying the recipient. The information identifying the recipient is preferably a unique user identifier, though it could be other identifying information. Also preferably, the information identifying the recipient is received via a web page, though it could be received via any network information exchange protocol. After receipt of this identifying information, the funds are credited to the deposit account associated with the recipient.

According to a beneficial aspect of the present invention, the processor processes the information identifying the recipient to determine if the recipient is a member of an enclosed community prior to causing funds to be credited to the deposit account associated with the recipient. An enclosed community is a group of network users known to the processor and to whose deposit accounts the processor has authority to electronically credit funds. If it is determined that the recipient is not a member of the enclosed community, the processor causes the communications port to transmit a notice to the recipient that the recipient must become a member of the enclosed community before funds will be credited to the deposit account associated with the recipient. As will be understood, a donor can send a monetary gift and e-card to anyone having a publicly accessible e-mail address.

According to a particularly beneficial aspect of the present invention, the electronic greeting card can be transmitted by the recipient to another recipient, referred to here as a second recipient, and the second recipient can receive the monetary gift. Preferably, the first recipient transmits the electronic greeting card to the second recipient. Though, the electronic greeting card can also be transmitted to the second recipient by the processor. In this aspect of the invention, the notification includes a hyper-link, as discussed above. The processor, also as above, receives information identifying the second recipient, and this information is processed to determine if the second recipient is a member of an enclosed community. If so, the processor then causes funds equal to the monetary gift amount to be credited to a deposit account associated with the second recipient. If the processing determines that the second recipient is not a member of the enclosed community, the processor causes the communications port to transmit a notice to the second recipient that the second recipient must become a member of the enclosed community before funds will be credited to the deposit account associated with the second recipient.

In another aspect of the present invention, the processor causes funds to be debited from an account associated with the donor. This debit may be in the amount of the monetary gift, or may be an amount different than the amount of the monetary gift. The donor account may be a deposit account, a savings account, a line of credit, a credit card, or a stored value account. This debiting is performed at either a time prior to causing the electronic greeting card to be transmitted to the recipient, or at a time subsequent to an activation of a hyper-link included in the transmitted electronic greeting card.

In another aspect of the present invention, the processor processes the request to determine if the recipient is a member of the enclosed community prior to processing the request and the input to generate the electronic greeting card. If the processor determines that the recipient is not a member of the enclosed community, the notification includes a notification that the recipient must become a member of the enclosed community before funds will be credited to the deposit account associated with the recipient.

According to another beneficial aspect of the invention, the processor is further configured to transmit the electronic greeting card to an electronic greeting card service prior to causing the electronic greeting card to be transmitted to the recipient. In such a case, the electronic greeting card service may then transmit the electronic greeting card to the recipient with or without further processing the electronic greeting card. Or, the electronic greeting card service may further process the electronic greeting card and then transmit the further processed electronic greeting card back to the processor. In such a case, the processor then transmits the further processed electronic greeting card to the recipient.

BEST MODE FOR CARRYING OUT THE INVENTION

Figure 1:
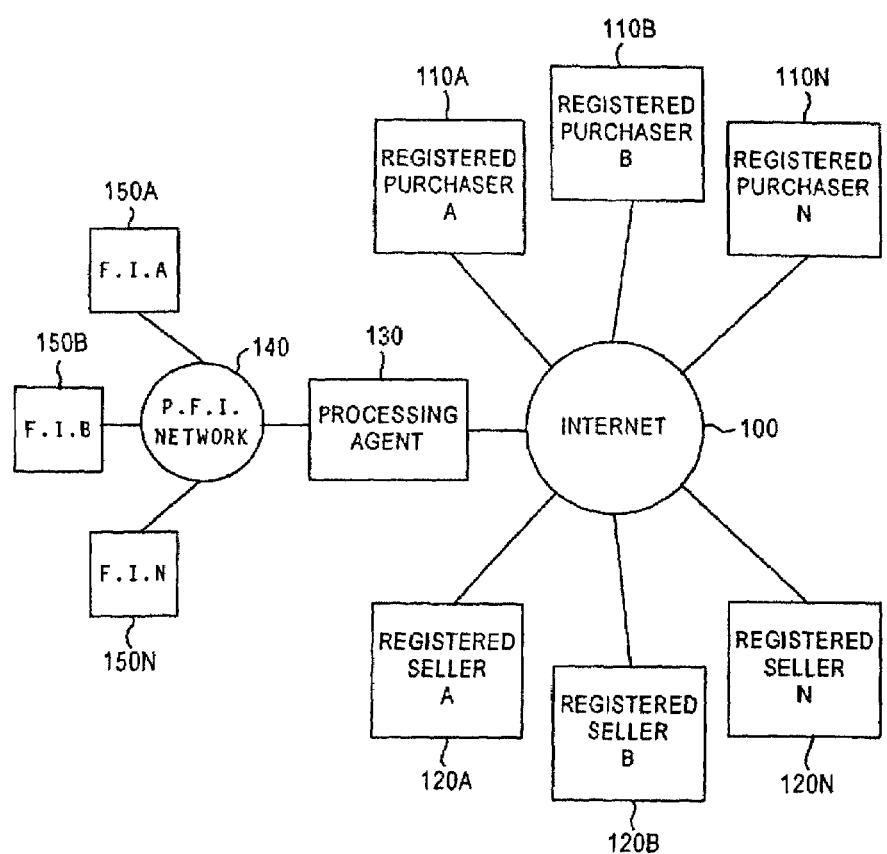
FIG. 1 depicts exemplary networks of the present invention and users of the networks.

As shown in FIG. 1, network 100 interconnects multiple registered purchasers 110A–110N, multiple registered sellers 120A–120N and a processing agent 130. The network 100 is shown to be the Internet, but could be virtually any type of network. Also shown is a network 140 interconnecting processing agent 130 and multiple financial institutes 150A–150N, each financial institute is associated with at least one of the purchasers 110A–110N, sellers 120A–120N, or processing agent 130. The network 140 is shown to be a private financial institute network, such as the currently existing bank network over which it is quiet common to electronically transfer funds between banks. Here again, the network 140 could be another type of network interconnecting the processing agent 130 to financial institutes 150A–150N. It should be understood that each of the registered purchasers 110A–110N and the registered sellers 120A–120N can be both a purchaser and a seller. Furthermore, a registered purchaser may be either an individual or a business, and a registered seller may be either an individual or a business. Also, the processing agent 130 can also be referred to as a payment service provider.

Each of the registered purchasers 110A–110N and registered sellers 120A–120N is preferably represented on the network 100 by a computer of the type depicted in FIGS. 9 and 10, which will be described further below. However, it should be recognized that virtually any network device could be utilized so long as the device has sufficient processing and communication capabilities to function in the described manner. The term "network device" includes personal digital assistants (PDA's), telephones, including cellular and/or digital telephones, and set-top boxes, among other devices. It will also be understood that a network device may connect to a network via wireless communications.

Figure 9:
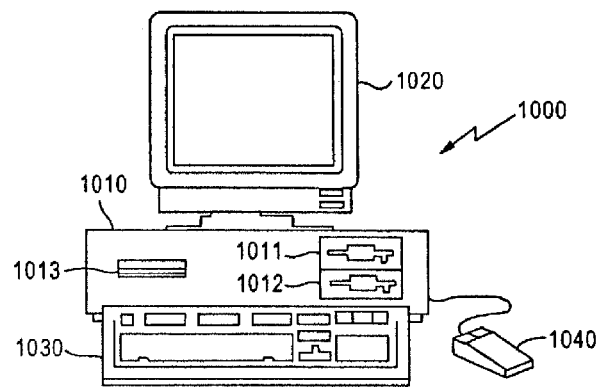
FIG. 9 depicts a computer suitable for use by a registered user to access the Internet in accordance with the invention.
Figure 10:
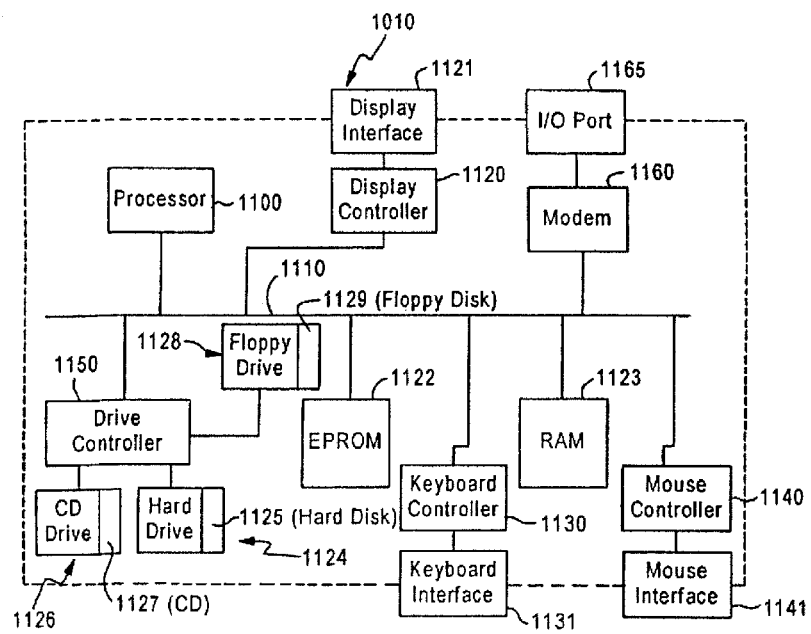
FIG. 10 is an exemplary block diagram of components of the computer depicted in FIG. 9.

FIGS. 9 and 10 depict an exemplary personal computer suitable for use by registered purchasers 110A–110N and registered sellers 120A–120N to access the Internet 100 in the below-described invention. The computer is preferably a commercially available personal computer. It will be recognized that the computer configuration is exemplary in that other components (not shown) could be added or substituted for those depicted and certain of the depicted components could be eliminated if desired.

The computer functions in accordance with stored programming instructions which drive its operation. Preferably, the computer stores its unique programming instructions on an EPROM, or hard disk. It will be recognized that only routine programming is required to implement the instructions required to drive the computer to operate in accordance with the invention, as described below. Further, since the computer components and configuration are conventional, routine operations performed by depicted components will generally not be described, such operations being well understood in the art.

Referring to FIG. 9, the computer 1000 includes a main unit 1010 with slots 1011, 1012, and 1013, respectively provided for loading programming or data from a floppy disk, compact disk (CD), hard disk, and/or other storage means, onto the computer 1000. The computer 1000 also includes a keyboard 1030 and mouse 1040 which serve as user input devices. A display monitor 1020 is also provided to visually communicate information to the user.

As depicted in FIG. 10, the computer 1000 has a main processor 1100 which is interconnected via bus 1110 with various storage devices including EPROM 1122, RAM 1123, hard drive 1124, which has an associated hard disk 1125, CD drive 1126, which has an associated CD 1127, and floppy drive 1128, which has an associated floppy disk 1129. The memories, disks and CD all serve as storage media on which computer programming or data can be stored for access by the processor 1100. A drive controller 1150 controls the hard drive 1124, CD drive 1126 and floppy drive 1128. Also depicted in FIG. 10 is a display controller 1120 interconnected to display interface 1121, a keyboard controller 1130 interconnected to keyboard interface 1131, a mouse controller 1140 interconnected to mouse interface 1141 and a modem 1160 interconnected to I/O port 1165, all of which are connected to the bus 1110. The modem 1160 and interconnected I/O port 1165 are used to transmit and receive signals via the Internet 100 as described below. It will be understood that other components may be connected if desired to the bus 1110, including communications components other than a modem. By accessing the stored computer programming, the processor 1100 is driven to operate in accordance with the present invention.

Processing agent 130 is preferably represented on networks 100 and 140 by an Internet server of the applicable type shown in FIGS. 11A and 11B, as will be described further below. However, here again, any network compatible device which is capable of functioning in the described manner could be substituted for the servers shown in FIGS. 11A and 11B.

Figure 11A:
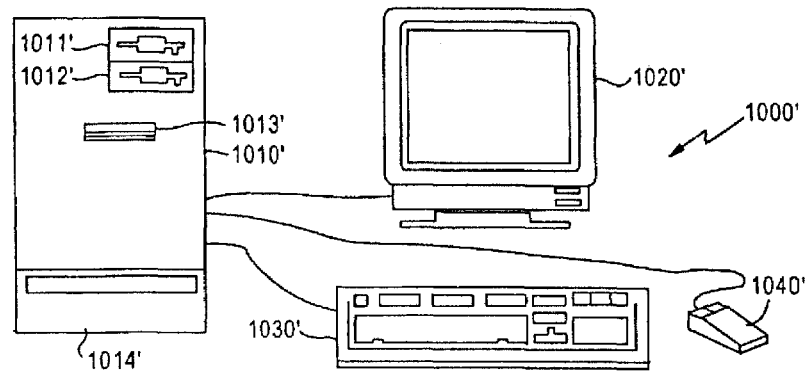
FIG. 11A depicts an Internet server suitable for use by the processing agent in accordance with the present invention.
Figure 11B:
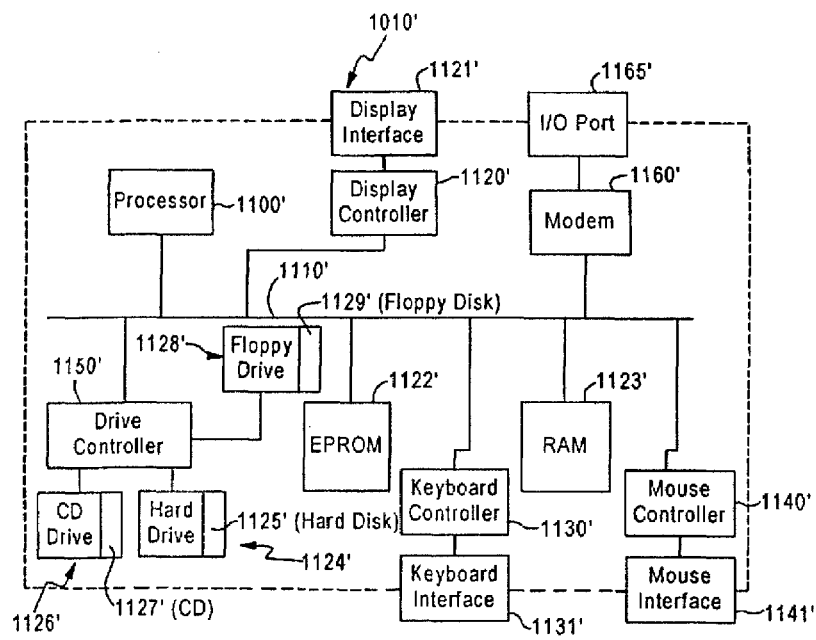
FIG. 11B is an exemplary block diagram of components of the server depicted in FIG. 11A.

FIGS. 11A and 11B depict an exemplary network server suitable for use by the processing agent 130 to access networks 100 and 140 in the below-described invention. The server is preferably a commercially available high power, mini-computer or mainframe computer. Here again, it will be recognized that the server configuration is exemplary in that other components (not shown) at could be added or substituted for those depicted and certain of the depicted components could be eliminated if desired.

The server functions as described below in accordance with stored programming instructions which drive its operation. Preferably, the server stores its unique programming instructions on an EPROM or hard disk. It will be recognized that only routine programming is required to implement the instructions required to drive the server to operate in accordance with the invention, as described below. Further, since the server components and configuration are conventional, routine operations performed by depicted components will generally not be described, such operations being well understood in the art.

Referring to FIG. 11A, the server 1000' includes a main unit 1010' with slots 1011', 1012', 1013' and 1014', respectively provided for loading programming or data from a floppy disk, CD, hard disk, and/or other storage means onto the server 1000'. The server 1000' also includes a keyboard 1030' and mouse 1040', which serve as user input devices. A display monitor 1020' is also provided to visually communicate information to the user.

As depicted in FIG. 11B, the server 1000' has a main processor 1100' which is interconnected via bus 1110' with various storage devices including EPROM 1122', RAM 1123', hard drive 1124', which has an associated hard disk 1125', CD drive 1126', which has an associated CD 1127', and floppy drive 1128', which has an associated floppy disk 1129'. The memories, disks and CD all serve as storage media on which computer programming or data can be stored for access by the processor 1100'. The stored data includes one or more databases containing information associated with registered sellers 120A–120N, registered purchasers 110A–110N and transactions between various ones of the registered sellers 120A–120N and the registered purchasers 110A–110N. The memories associated with the server hereafter will be collectively referred to as memory 1170. A drive controller 1150' controls the hard drive 1124', CD drive 1126' and floppy drive 1128'. Also depicted in FIG. 11B is a display controller 1120' interconnected to display interface 1121', a keyboard controller 1130' interconnected to keyboard interface 1130', a mouse controller 1140' interconnected to mouse interface 1141' and a modem 1160' interconnected to I/O port 1165', all of which are connected to the bus 1110'. The modem 1160' and interconnected I/O port 1165' are used to transmit and receive signals via the Internet 100 as described above. It will be understood that other components may be connected if desired to the bus 1110', including communications components other than a modem. By accessing the stored computer programming, the processor 1100' is driven to operate in accordance with the present invention.

Figure 2:
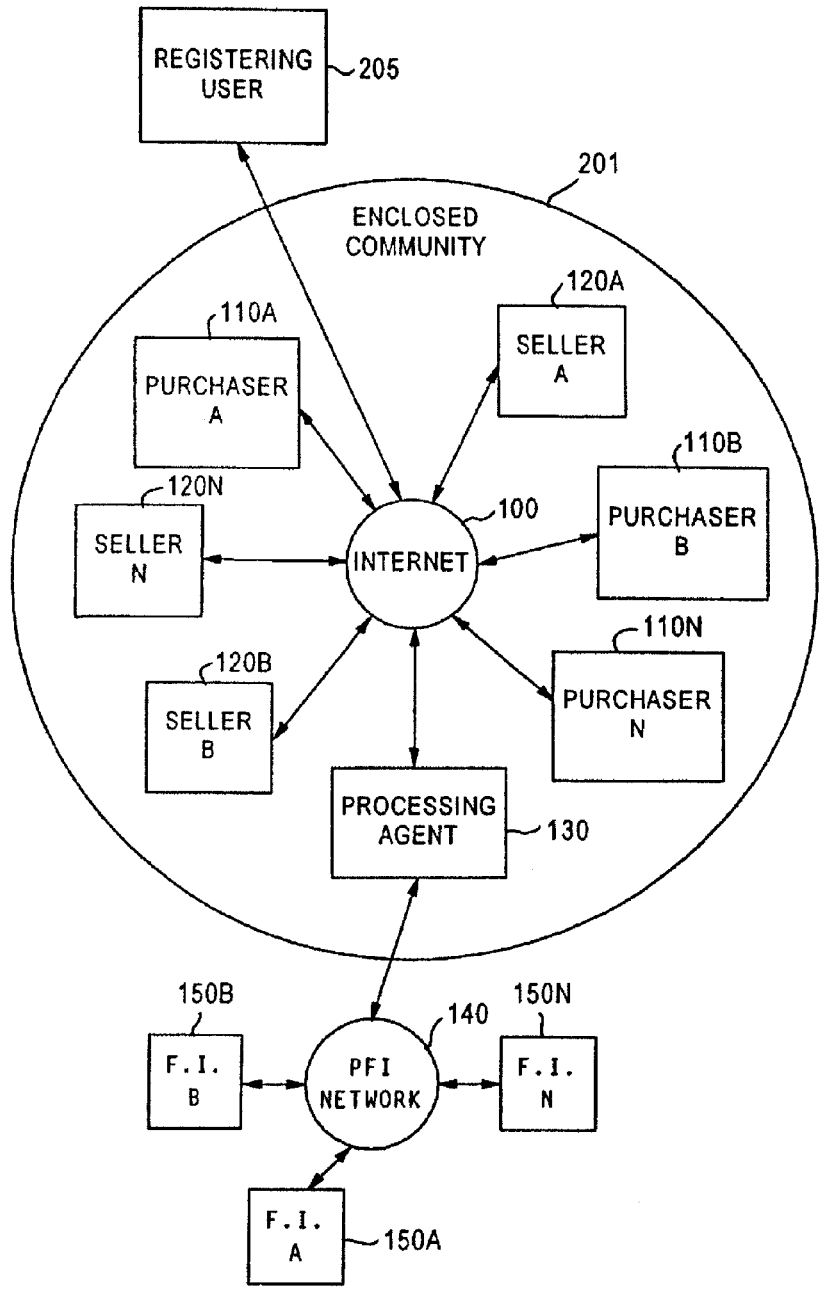
FIG. 2 depicts the enclosed community in accordance with the present invention populated with registered purchasers, registered sellers, and a processing agent.

As shown in FIG. 2, the registered purchasers 110A–110N, registered sellers 120A–120N, and processing agent 130 are part of an electronic enclosed community 201. Registering user 205 is not a part of the enclosed community 201, and as such cannot utilize the services of the processing agent 130. Whereas, each of the registered purchasers 110A–110N and registered sellers 120A–120N can utilize the services offered by the processing agent 130. The financial institutions are not necessarily a part of the enclosed community 201. For purposes of the following discussion, the financial institutions are depicted as being separate from the enclosed community 201, however it should be understood that any of the financial institutions can be a registered user.

Registered users, the purchasers and the sellers, interact directly with each other via the Internet 100. Registered purchasers 110A–110N and registered sellers 120A–120N negotiate the terms of financial transactions between one another.

The registered purchaser makes payment to the registered seller via the services of the processing agent 130, which is also a part of the enclosed community 201. The processing agent 130 directs payments between registered users. Preferably, the payments are made in the form of an electronic debit to the registered purchaser's demand deposit account (DDA) and a corresponding electronic credit to the registered seller's (DDA). Debits and credits can alternatively be made to accounts other than demand deposit accounts, such as savings accounts, credit accounts and brokerage accounts, among other types of accounts. Though, preferably, credits are made to a DDA. Also preferably, the electronic debits and electronic credits from and to demand deposit accounts are made via the automated clearinghouse bank network (ACH), though networks and other electronic means may be used to affect the debits and credits. The processing agent 130 electronically affects the transfer of funds from the purchaser's financial institution to the seller's financial institution while shielding both the purchaser's and the seller's financial institution and account information from one another and providing the seller with payment trustworthiness. To utilize services offered by the processing agent 130, a user must register to become a member of enclosed community 201. Once a user registers, the user need not undergo the registration process again. Thus, once registered, a user can make payments to, or receive payments from, any other registered user.

Figure 3:
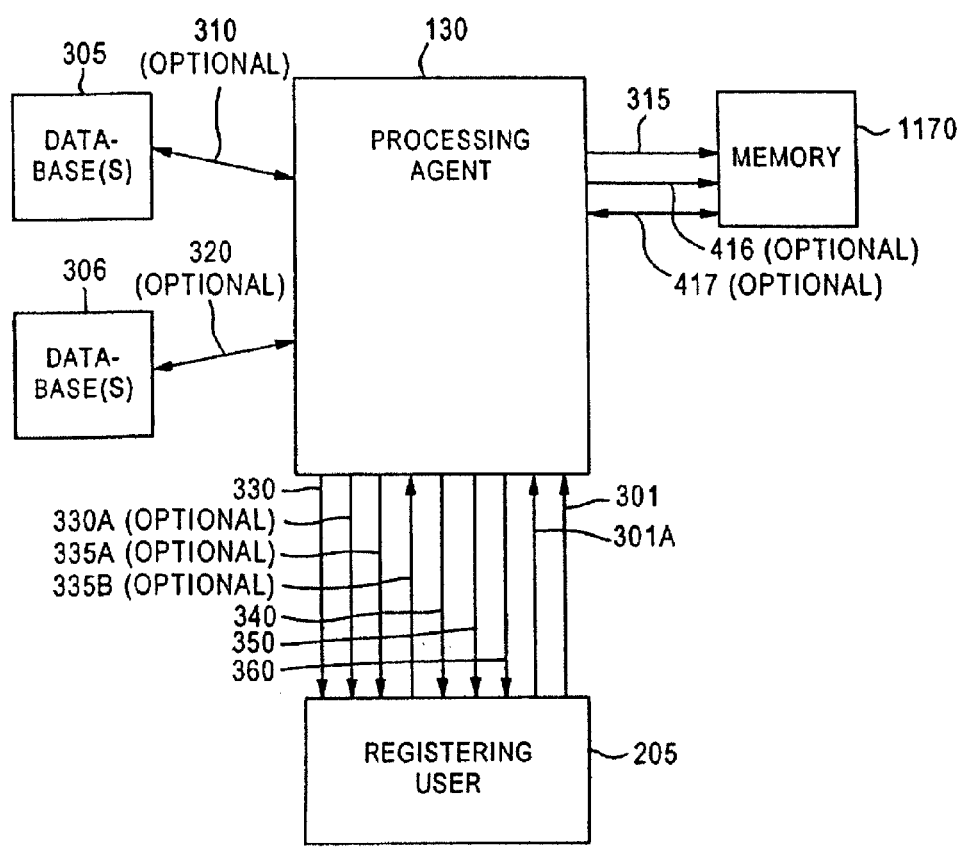
FIG. 3 depicts the communications, in a first alternative, to register a user with the processing agent of the present invention.
Figure 4:
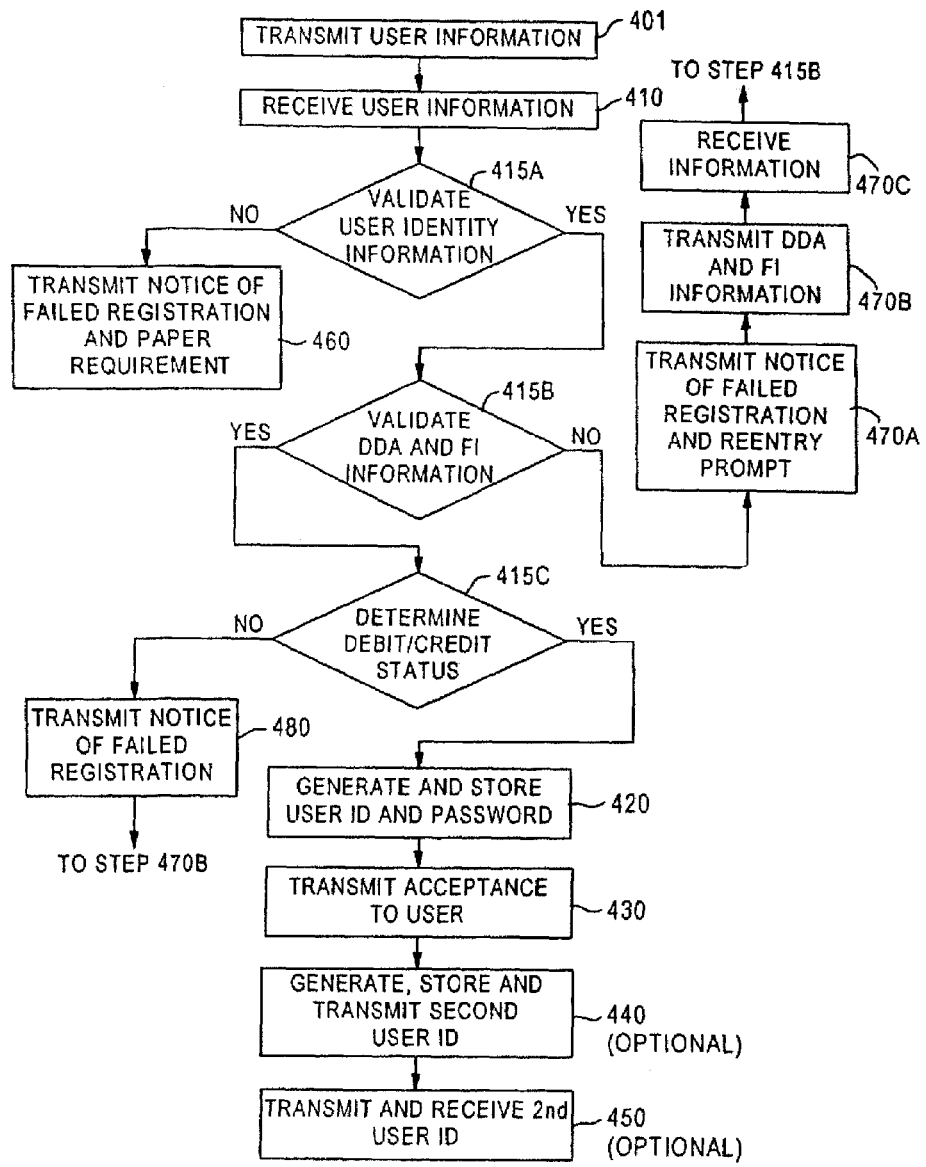
FIG. 4 is a flow chart showing the operations which are, in a first alternative, performed by a registering user and the processing agent of the present invention to register a registering user.

The communications for, and steps of, the registration process are depicted in FIGS. 3–8. As described below, the registering user 205 identifies a single DDA during the registration process, though it will be understood that the registering user 205 may identify an account other than a DDA. As shown in FIG. 3, registering user 205 contacts the processing agent 130 on-line via communication 301. The registering user 205 transmits, via the Internet 100, at least information identifying the registering user 205, an account number of a demand deposit account (DDA) belonging to the registering user 205, and information identifying the financial institution at which the DDA is maintained, among other information, as depicted at step 401 of FIG. 4. This information may be submitted via an enrollment form transmitted to the registering user 205 by the processing agent 130 via the Internet 100. The registration information received by the processing agent 130 via the Internet 100, as shown in step 410. The processing agent 130 processes in real-time, that is, while the registering user 205 is on-line, the received information to register the registering user 205 and informs the registering user 205, also in real-time, of the registration status of the registration process.

Optionally, processing agent 130 may accept more than one account from which to electronically debit and/or to which to electronically credit. In such a case, registering user 205 submits information identifying one or more accounts and the associated financial institutions. It should be understood that in this scenario, whenever a registered user has identified more than one account, the registered user may identify the account from which funds are to be debited on a per transaction basis. Or, the registered user may identify a single account from which all debits are to be made. When receiving funds, the registered user may identify the account to which funds are to be credited on a per transaction basis. Or, the registered user may identify a single account to which all credits are to be made. Furthermore, a registered user may identify a single account from which all debits are to be made, and a different single account to which all credits are to be made.

The registering user 205 may be a member of another enclosed community, such as an on-line auction site, financial institution site, Internet portal site, on-line electronic greeting card site, or merchant Web site among others. Another director of an enclosed community can present to its members an option to become a member of enclosed community 201. These directors are known as sponsors. If a member of another enclosed community chooses to become a registered user of enclosed community 201 from an option presented by another enclosed community, the sponsor can pre-populate an enrollment form with any data that is already maintained by the other enclosed community and also required to register with enclosed community 201. The registering user 205 must complete the enrollment form and transmit it to processing agent 130. From this point forward, registration is the same as described herein.

In another alternative, a sponsor may interact with the processing agent 130 to register a registering user. That is, the sponsor presents to the processing agent 130 any required information to register the registering user.

Processing the information includes the processing agent 130 validating, at step 415A, the information identifying the registering user 205 received by the processing agent 130, this can include validating the registering user's 205 address. The identity information can include a name, social security number, mailing address, city, state, phone numbers, zip code, date of birth, e-mail address, and driver license number, among other information associated with the registering user 205. If the processing agent 130 determines that the information identifying the registering user 205 is valid, processing continues as depicted in step 415B.

The identity validation process can include accessing one or more databases 305, via communication 310, in real-time containing identity information to determine if the received identity information corresponds with that in the database(s) 305. This processing may also include verifying that the identity information does not violate one or more predetermined parameters identified by database(s) 305. As shown in FIG. 3, database(s) 305 is not stored in memory 1170. However, it will be understood that database(s) 305 may be stored in memory 1170.

Processing the received information also includes the processing agent 130 validating, at step 415B, the received DDA number and the information identifying the associated financial institution. If the information identifying the DDA and the financial institution is validated, processing continues as depicted in step 415C.

As shown in step 415C, the processing agent 130 determines if the DDA can be electronically debited and/or credited. If the information identifying the registering user 205 and the information identifying the DDA and the financial institution is validated, and the DDA can be electronically debited and/or credited, the registering user 205 is notified in real-time, via communication 330, that the registering user 205 has been accepted into the enclosed community 201, as depicted in step 430.

The DDA number/financial institution processing can include accessing, also in real-time, one or more databases 306, via communication 320, containing information associated with demand deposit accounts and financial institutions to validate the received DDA/financial institution information and to determine if the DDA associated with the registering user 205 can be electronically debited and/or credited. As shown in FIG. 3, database(s) 306 is not stored in memory 1170. However, it will be understood that database(s) 305 may be stored in memory 1170.

The processing agent 130 generates and stores in memory 1170 a unique user identifier, and optionally password, associated with the registering user 205, along with the received registration information, as depicted in step 420 and communication 315. Additionally, other information identifying the registering user 205 may also be stored in memory 1170. The unique user identifier identifies a user to the processing agent 130. For those registering users registering from another enclosed community, an indicator of the enclosed community from which the registering user is registering is also stored. Optionally, the registering user 205 may select the user identifier and/or password. The unique user identifier, and password if applicable, are transmitted, preferably in real-time, to the newly registered user 205. This may be either via communication 330, or in separate optional communication 330A. If the unique user identifier, or unique user identifier and password, is/are not transmitted to a registering user in real-time, it/they may be sent to the registering user via e-mail or other communication. Generation and storage of the unique user identifier, or unique user identifier and password, step 420, may take place prior to any of steps 415A, 415B, or 415C, though as depicted in each of FIGS. 4 through 7, it follows these steps.

Steps 440 and 450 depict optional processing, which includes the processing agent 130 generating and storing in memory 1170, via communication 416, a second identifier associated with the newly registered user 205. This second identifier is transmitted to the newly registered user via a non-real-time communication, depicted as communication 335A. That is, it is transmitted to the user either via e-mail, or traditional postal delivery. The second identifier can be thought of as a registration confirmation. As depicted in step 450, the newly registered user 205 contacts the processing agent 130 after receipt of the second identifier and transmits the second identifier to the processing agent 130, depicted as communication 335B. The second identifier is received by the processing agent 130. The processing agent 130 then matches the received second identifier with that stored in memory 1170, via communication 417, and confirms the newly registered user's 205 registration. When the second user identifier is optionally utilized, the newly registered user may direct debits from and/or credits to the newly registered user's DDA. However, the processing agent 130 will not effect these transactions until the newly registered user transmits to the processing agent 130 the second identifier. Thus, even with the optional processing in steps 440 and 450 executed, newly registered user 205 may immediately begin to utilize the services of the processing agent 130. If, after a predetermined period, the newly registered user 205 does not transmit to the processing agent 130 the optional second identifier, the newly registered user's 205 registration may be revoked and any pending transactions may be cancelled.

If the processing agent 130 cannot validate the identity information, the registering user 205 is informed in real-time, via communication 340, that the processing agent 130 is unable to register the user, as depicted in step 460. The communication also informs the registering user 205 that the registering user 205 should provide the processing agent 130, via traditional postal delivery, a voided check drawn on the user's DDA, along with the information identifying the registering user 205 and the DDA and financial institution information to process the registration in non-real-time. Additionally, the information requested from the registering user 205 may also include additional information identifying the registering user 205 not required for the on-line registration process.

If the processing agent 130 cannot validate the DDA and financial institution information, the registering user 205 is informed in real-time, via communication 350 that the DDA and financial institution information cannot be validated, as depicted in step 470A. The registering user 205 is also prompted to reenter the DDA/financial institution information, as a possible reason for validation failure can be improper entry of this information by the registering user 205. If the registering user 205 reenters and retransmits the required DDA/financial institution information, as depicted in step 470B and communication 301A, the processing agent 130 receives the information, step 470C, and validates the newly received DDA/financial institution information. If the registering user 205 does not resubmit this information, or if the resubmitted information cannot be validated, registration fails.

If the processing agent 130 determines that the DDA is not electronically creditable and/or debitable, the registering user 205 is informed, at step 480 and via communication 360, that the registration has failed. The notification can optionally include a prompt for the registering user to enter information identifying another account and the associated financial institution. If registering user 205 transmits information identifying another account, operations continue as depicted in step 470B. If not, registration fails.

Figure 5:
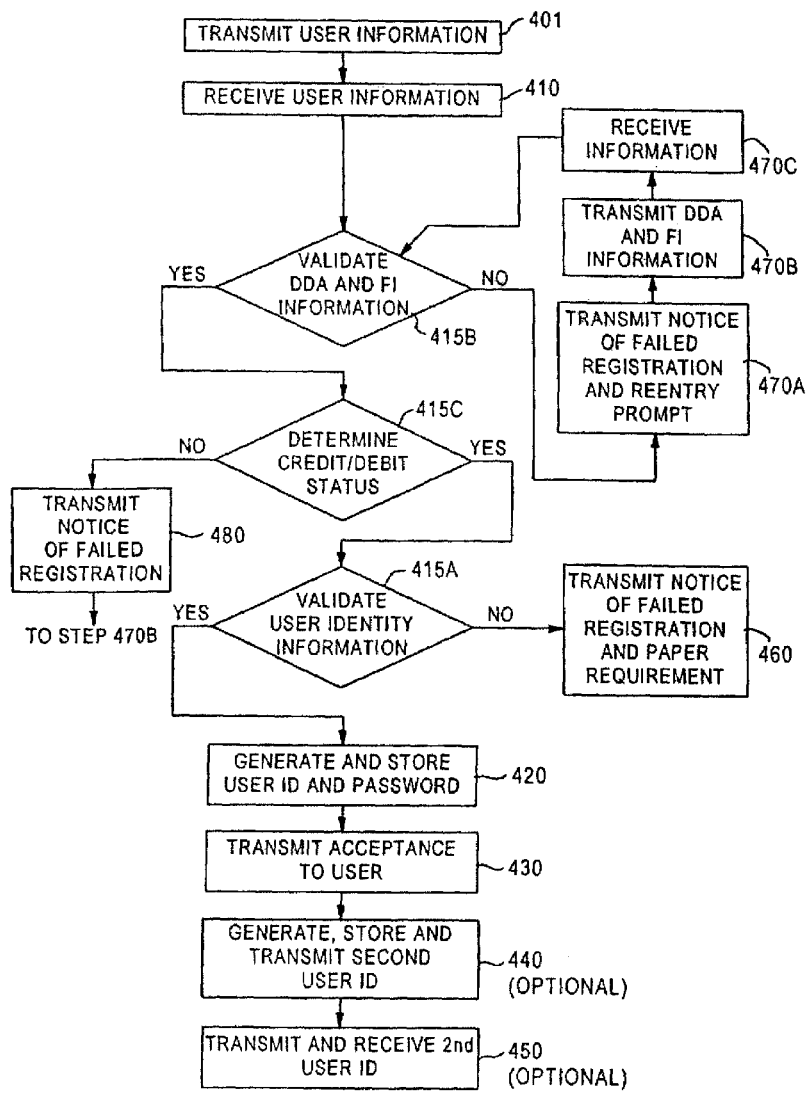
FIG. 5 is a flow chart showing the operations which are, in a second alternative, performed by a registering user and the processing agent of the present invention to register a registering user.

FIGS. 5–8 depict optional registration operations. FIG. 5 shows the steps of the registration process in a different order than discussed above. It should be understood that step 415A and, if processing determines the necessity of, step 460 may follow step 415C, and precede step 420, as depicted in FIG. 5. The processing remains the same as that depicted in FIG. 4, only the order has changed. Furthermore, though not shown, steps 415A and 415B may be executed essentially concurrently.

Figure 6:
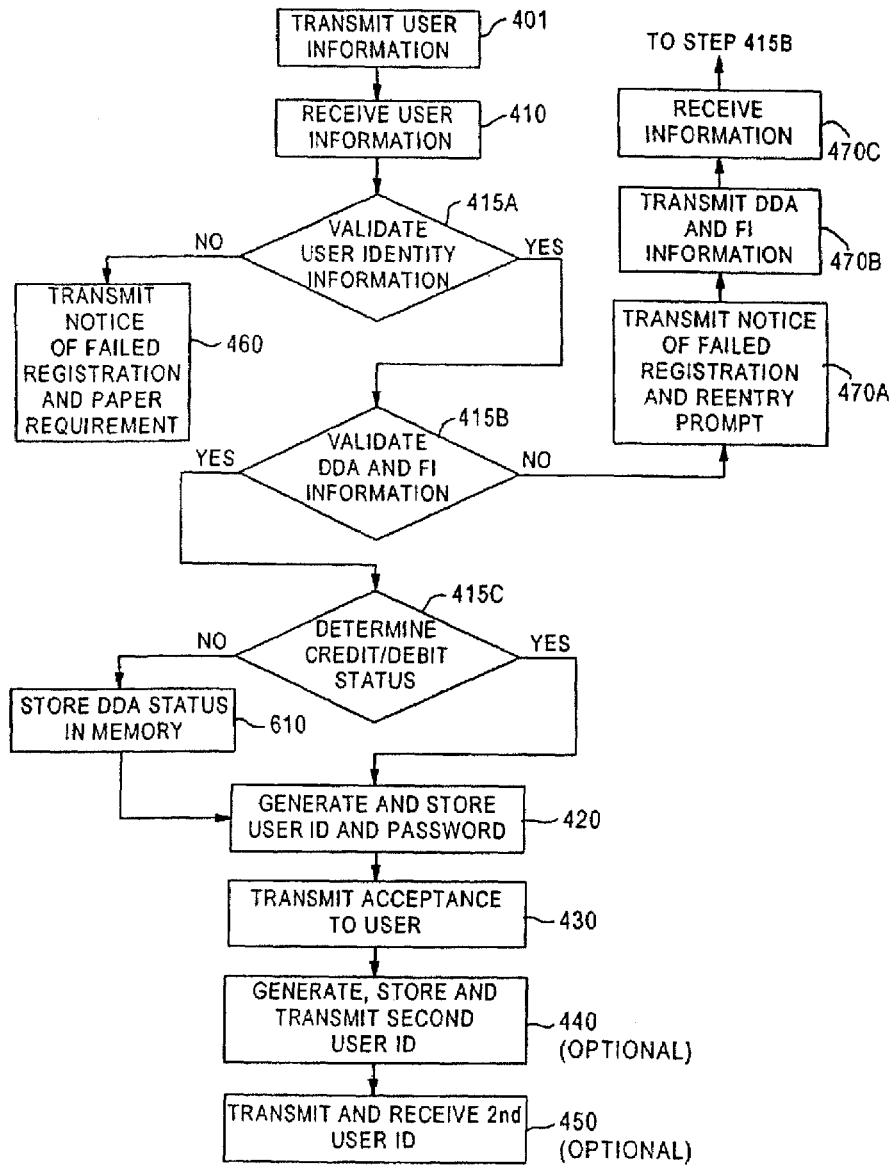
FIG. 6 is a flow chart showing the operations which are, in a third alternative, performed by a registering user and the processing agent of the present invention to register a registering user.
Figure 7:
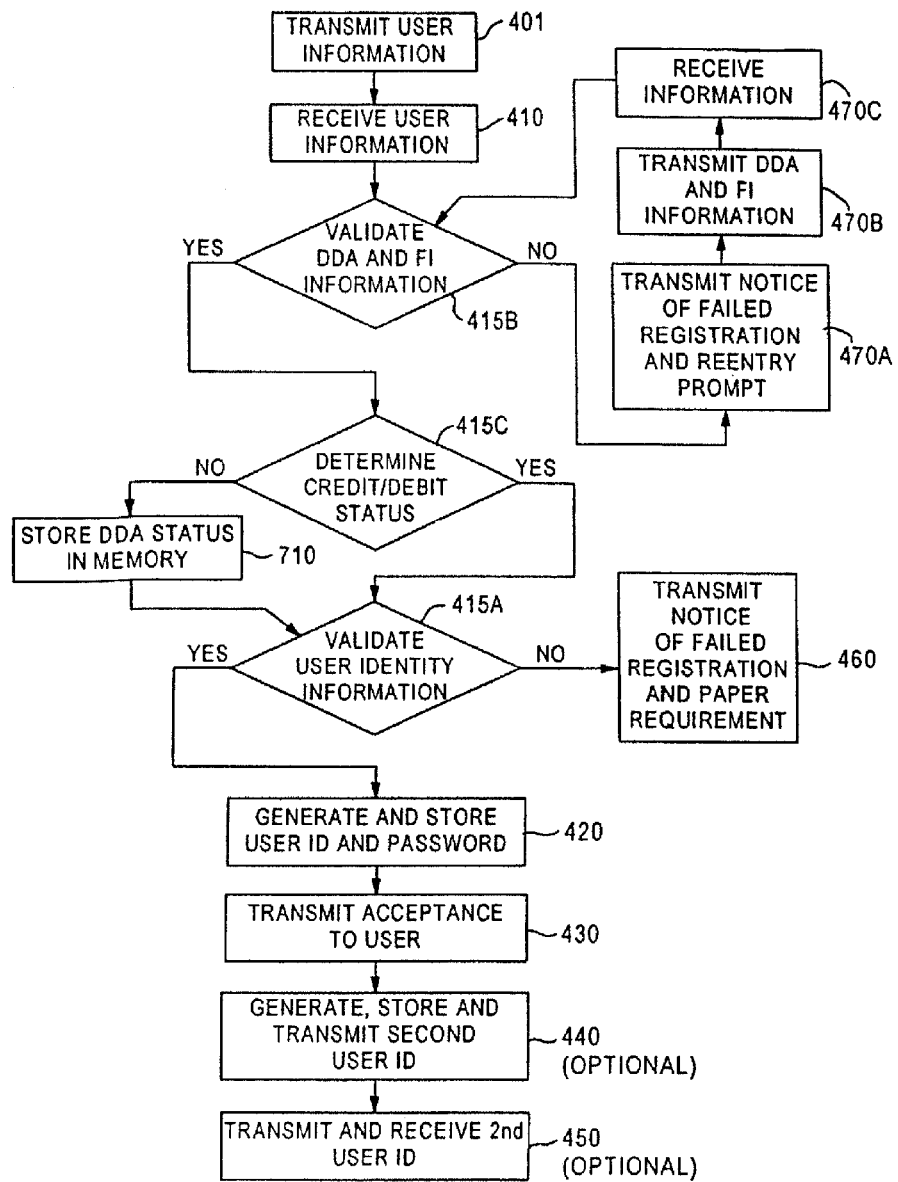
FIG. 7 is a flow chart showing the operations which are, in a fourth alternative, performed by a registering user and the processing agent of the present invention to register a registering user.
Figure 8:
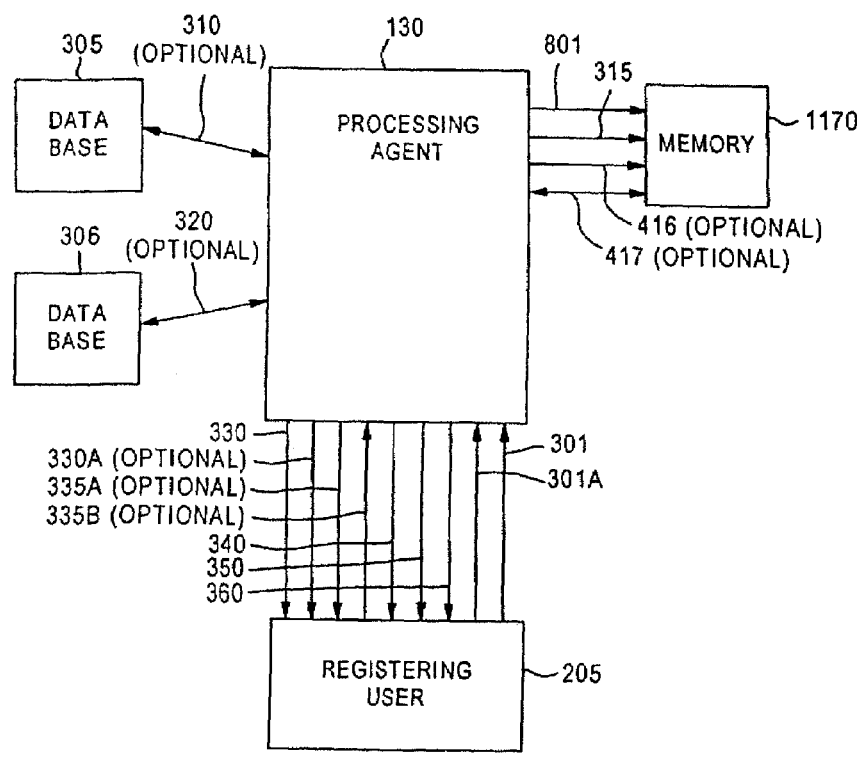
FIG. 8 depicts the communications, in a second alternative, to register a user with the processing agent of the present invention.

FIGS. 6–8 depict yet further registration options. As shown in step 610 of FIG. 6 and step 710 of FIG. 7, if the processing agent 130 determines that the DDA cannot be electronically debited and/or credited, at step 415C, the status of the DDA account as not being electronically debitable and/or creditable is stored in the memory 1170 via communication 801, as depicted in FIG. 8. In the sequence of processing depicted in FIG. 6, processing then continues with the operations shown at step 420. In the sequence of processing depicted in FIG. 7, processing then continues with the operations shown at step 415A. Thus registering user 205 may be accepted into the enclosed community 201 even though the registering user's 205 DDA is not electronically debitable and/or creditable.

The processing agent 130 makes further determinations relating to the newly registered user 205. These determinations, though, may or may not be made in real-time. They may be concurrent with the above-described processing, or they may follow. They can be made only once, or multiple times. The determinations may be made each time a registered user directs a financial transaction via processing agent 130, or periodically as deemed necessary by the processing agent 130. These determinations concern credit risks the processing agent 130 will assume in providing the above-described payment service, and other services to be described below.

In effecting the transfer of funds from a registered purchaser's financial institution to a registered seller's financial institution, the processing agent 130 is the originator of these transactions and is therefore the recipient of, and responsible for, any returned debits or credits. The processing agent 130 determines risk factors on a per-registered user basis. This determination can include evaluating the credit history of the newly registered user 205, identification of DDA closures, and retrieval of bad check history relating to the newly registered user 205.

The information received from registering user 205 to initiate the registration process may also include a request to make a payment on behalf of the registering user. In such a case, if the identity information and the account and financial institution information is verified, the processing agent 130 can immediately execute payments on behalf of the user as described below. Thus, a registering user can not only register in real-time, but also immediately direct payments. Furthermore, as registration is preferably performed real-time while a registering user and the processing agent 130 participate in a communications session, that user may direct a payment during the communications session subsequent to receiving registration confirmation with or without transmitting or knowing his unique identifier. Also, a user may direct a payment without being registered, and without submitting registration information. In such a case, the processing agent 130 will inform the user that the user must register. The payment request will be held until registration is completed. Upon registration, the request will be executed. Thus, the payment request may be received previous to registration information. As will be described below, several types of transactions can be conducted by the processing agent 130. A user can request that any of these transactions be initiated while participating in an on-line communication session in which the user registers, without the user transmitting and/or knowing his unique identifier. This includes the user submitting the request prior to submitting registration information, submitting the request with the registration information, or submitting the request subsequent to providing the registration information.

Figure 12:
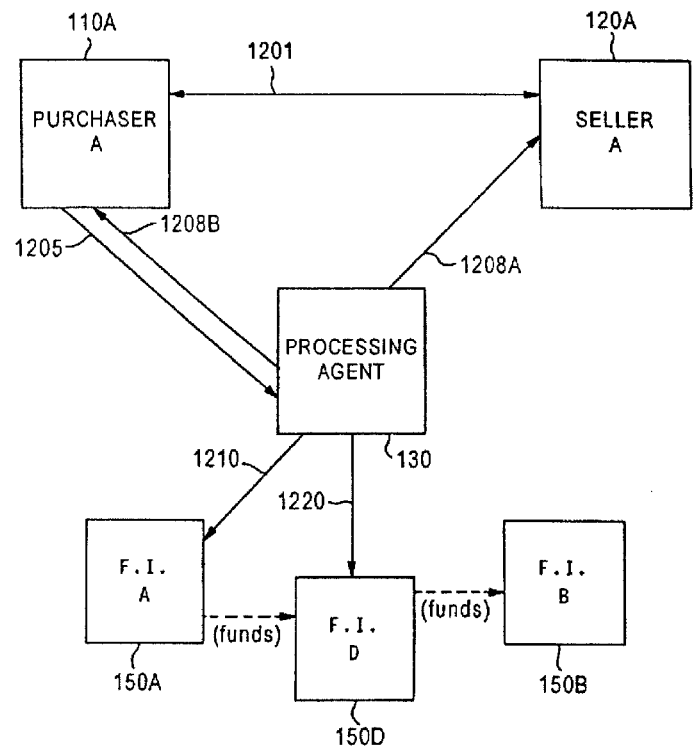
FIG. 12 depicts the communications between various registered users and the processing agent depicted in FIG. 2 to effect a sale transaction in accordance with the present invention.
Figure 13:
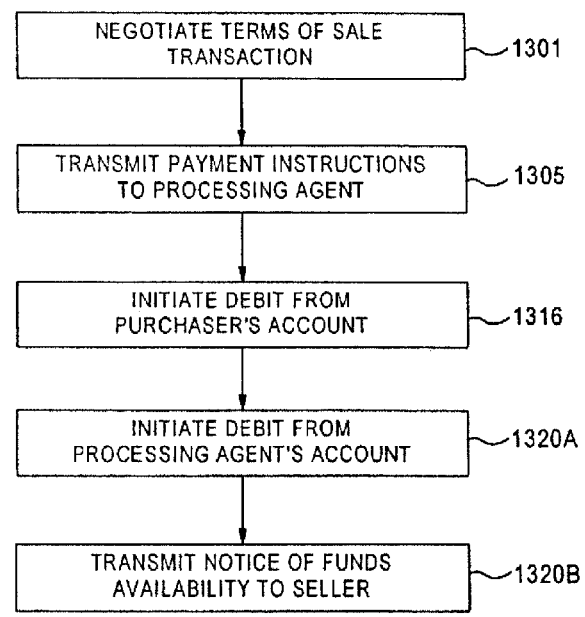
FIG. 13 is a flow chart showing the operations which are performed by the registered users and processing agent to effect a sale transaction in accordance with the present invention.
Figure 14:
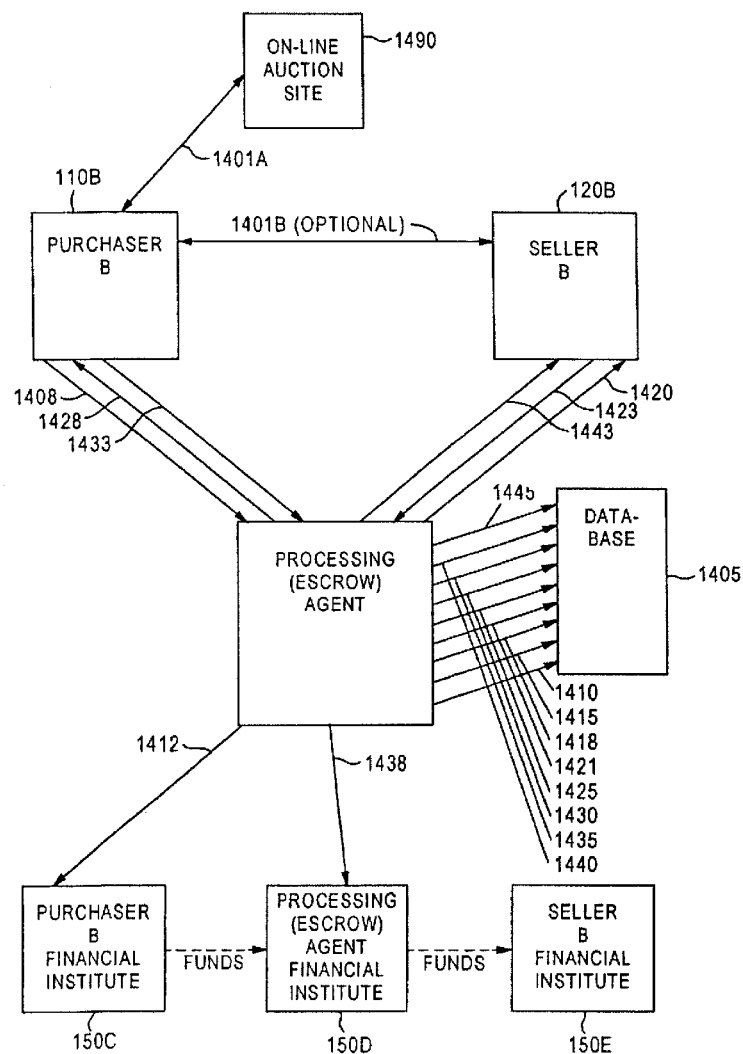
FIG. 14 depicts the communication between various registered users and the processing agent depicted in FIG. 2, in a first alternative, to effect an escrow transaction in accordance with the present invention.
Figure 15A:
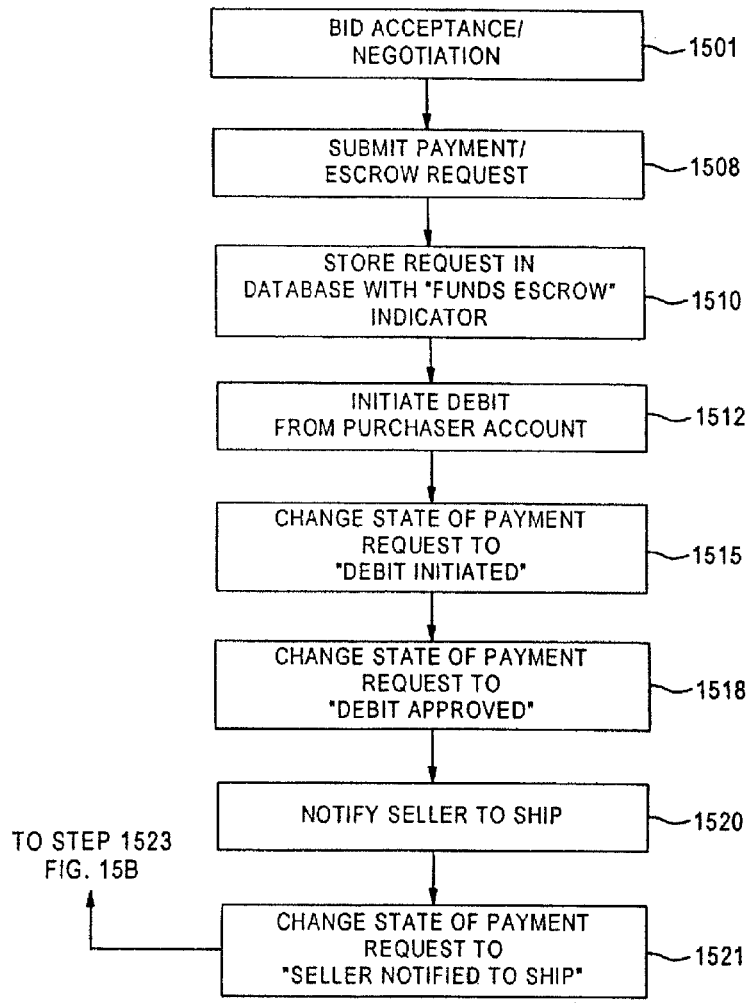
FIGS. 15A–C are flow charts showing the operations which are performed by the registered users and processing agent, in a first alternative, to effect an escrow transaction in accordance with the present invention.
Figure 15B:
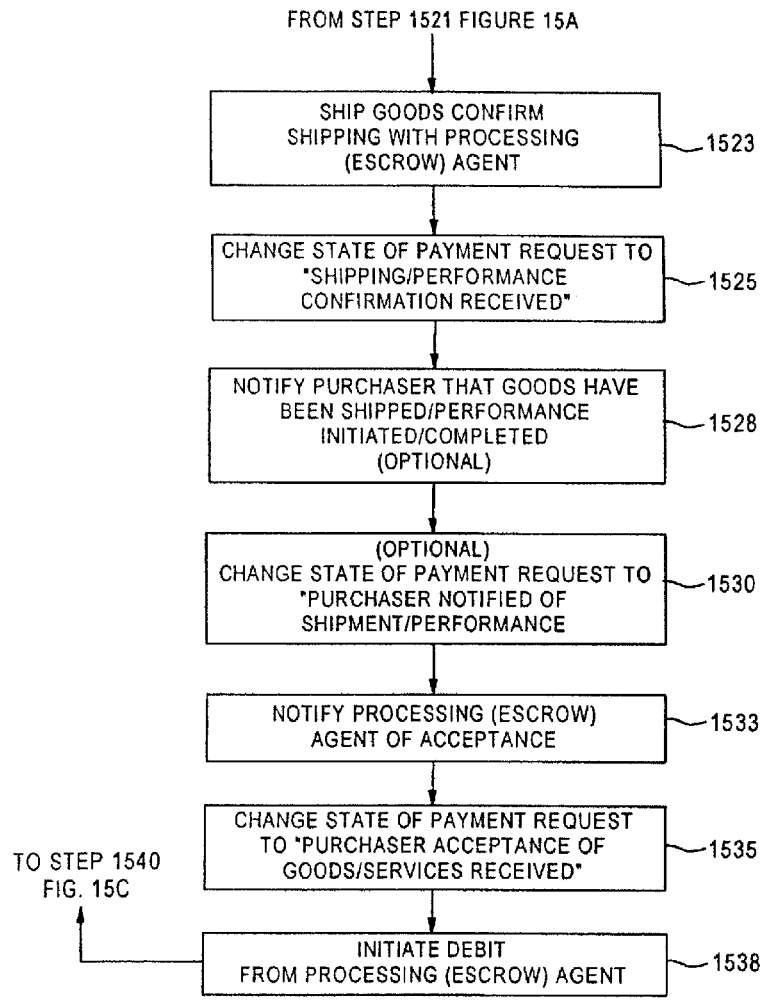
Figure 15C:
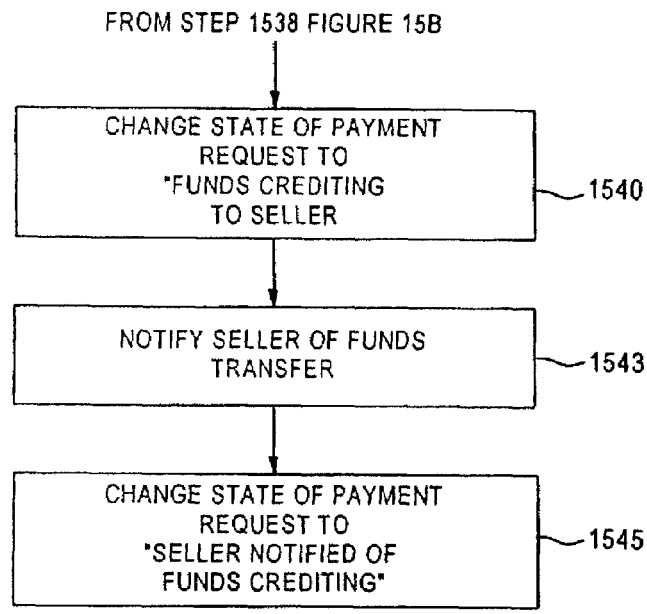
Figure 16:
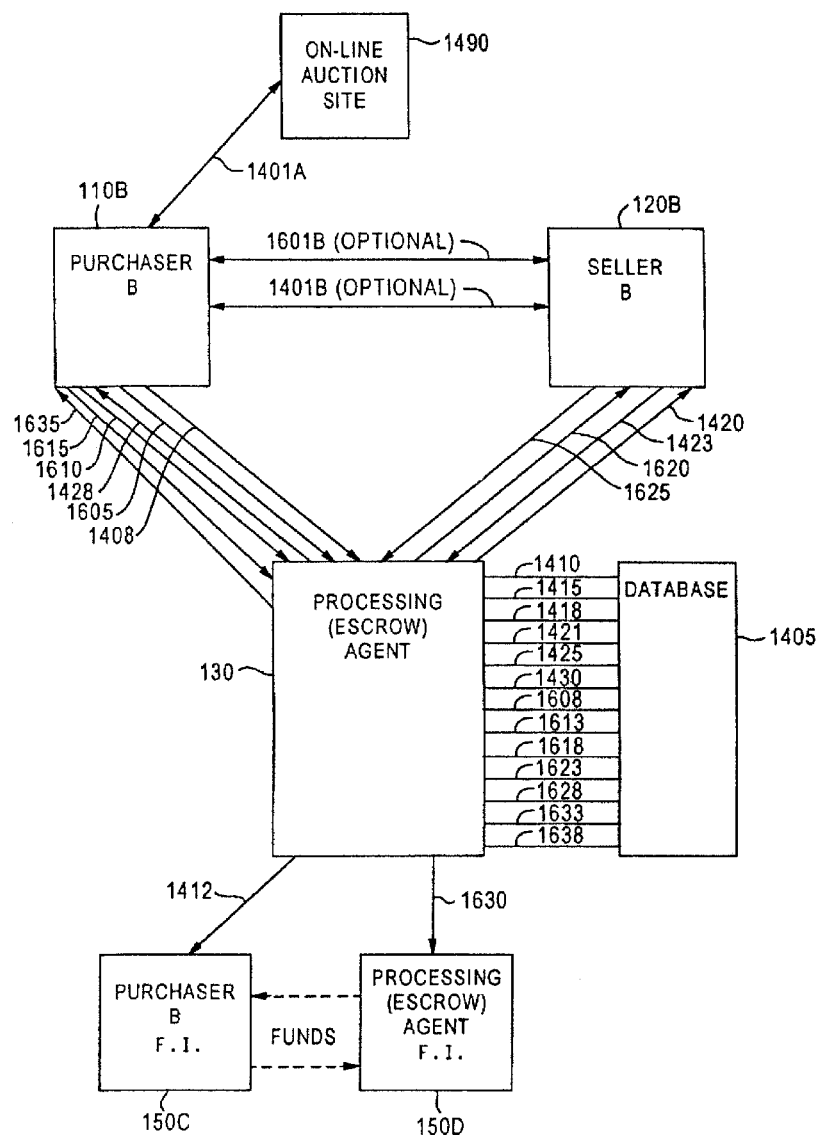
FIG. 16 depicts the communications between various registered users and the processing agent depicted in FIG. 2, in a second alternative, to effect an escrow transaction in accordance with the present invention.

FIGS. 12 and 13 show the communications for, and steps of, a purchase transaction between purchaser A 110A and seller A 120A effected through processing agent 130. In should be understood that registered purchaser A 110A and registered seller A 120A are individuals, though one or both could be businesses or another type of organization. It should also be understood that the communications shown between purchaser A 110A, seller A 120A, and the processing agent 130 are preferably made via the Internet 100, though another network could be used. As depicted in communication 1201 and step 1301, purchaser A 110A and seller A 120A, who are both registered members of the enclosed community 201, negotiate the terms of a sale transaction. The processing agent 130 is not a party to the negotiations. Seller A 120A may present goods or services on a homepage belonging to seller A 120A, or seller A 120A may post goods and services for sale on an electronic public bulletin board, or advertise their availability either on the Internet or otherwise.

Purchaser A 110A contacts processing agent 130, as shown via communications 1205 and at step 1305, and transmits payment instructions to the processing agent 130. The payment instructions include the amount of the payment and the unique user identifiers associated with seller A 120A and purchaser A 110A and optionally the password associated with purchaser A 110A. Optionally, payment information can include a future date upon which payment is to be made. Purchaser A 110A may contact processing agent 130 via a hyper-link included in a Web homepage associated with seller A 120A, or included in an electronic public bulletin board. Or, purchaser A 110A may contact processing agent 130 directly via the Internet 100.

Irrespective of how processing agent 130 receives the instruction, processing agent 130 processes the transmitted payment information and stores a persistent indicator in memory 1170 that the transaction is a sale transaction. This may be stored in a database containing information relating to sale transactions. Processing Agent 130 initiates a debit from, or initiates at a future date if so directed, via communication 1210 and depicted at step 1316, the account associated with purchaser A 110A. The corresponding credit is directed to an account associated with processing agent 130. FIG. 12 shows the account associated with registered purchaser A 110A as being maintained at financial institution 150A. And, as shown in FIG. 12, the account associated with processing agent 130 is maintained at financial institution 150D. As should be understood, the account, preferably a DDA, associated with processing agent 130 may be maintained at any financial institution capable of electronic transfers.

To ameliorate the financial risk processing agent 130 is subject to, a debit from processing agent 130 and corresponding credit to seller A 120A may not be effected for a predetermined period of time after the debit from the account associated with purchaser A 110A is initiated. FIG. 13 depicts operations when an debit is not returned uncollected during a predetermined period. When the predetermined period has elapsed, preferably three days, though it could be a shorter period or a longer period depending upon risk factors, and the debit has not been returned uncollected, the processing agent 130 initiates a debit from, via communication 1220 and at step 1320A, the account associated with the processing agent 130. This debit results in a corresponding credit to the account associated with registered seller A 120A maintained at financial institution 150B.

Processing agent 130 informs registered seller A 120A that seller A 120A has new funds available via communication 1208A and at step 1320B. This preferably is done via e-mail. This notification can be executed once the debit to the purchaser's account has been initiated, or once funds have actually been obtained from the purchaser's account.

Optionally, the operations depicted in steps 1320A and 1320B can be executed immediately after processing agent 130 receives a corresponding credit to the debit from the account associated with registered purchaser A 110A, yet before the predetermined period has elapsed.

If the debit to registered purchaser A 110A is returned uncollected, registered purchaser A 110A may be prevented from directing any further payments for a period of time, or until the debit is collected.

Any of registered sellers 120A–120N may be a merchant maintaining a Web site presenting goods or services for purchase. The operations to effect a funds transfer to a merchant are essentially the same as those described above in relation to payments between individuals.

The merchant's Web site can include a hyper-link which connects a customer to processing agent 130. Of course, if the customer is not a registered user, the customer must register before any payments will be executed on his behalf by the processing agent 130. Selecting the hyper-link causes processing agent 130 to present a Web page to the registered purchaser that contains data pertaining to the goods being purchased. The page contains the registered seller's name, unique identifier, item description, payment amount, and optionally, a payment date. This information is captured from the merchant Web site. The Web page also includes a hyper-link selectable by the registered purchaser to cause the transaction to be initiated. The registered purchaser must submit his unique identifier, and optionally, password, before the transaction can be processed. The Web page can include a field or fields for entry of this information. Thereafter, operations continue as depicted in steps 1305–1320B in FIG. 13. If the purchaser were not a registered user, the purchaser would have to register before the transaction could be completed.

The sale transaction between a registered purchaser and a registered seller may result from an Internet auction. Payment between the winning bidder, who is the purchaser, and the seller can be effected through the processing agent 130, as discussed above. As with the above-described non-auction payment transaction, the parties to an auction payment transaction must be members of the enclosed community 201.

Another service offered by the processing agent 130 is that of the processing agent 130 acting as an escrow agent. FIGS. 14–17C depict the communications of, and steps for, the processing agent 130 to serve as an escrow agent between registered purchaser B 110B and registered seller B 120B from a sale arising from an Internet auction, though the sale can arise otherwise. The processing (escrow) agent 130 maintains funds associated with the transaction in an account, shown in FIG. 14 as maintained at financial institution 150D, until the associated products are satisfactorily received and accepted by the registered purchaser B 110B, or until the seller has satisfactorily performed some service obligation. This account will be referred to herein as an escrow account. The processing (escrow) agent 130 is the hub of a signaling infrastructure supported by a database 1405 that maintains information about registered purchasers, registered sellers, and transactions between one of the registered purchasers and registered sellers. Thus, the processing (escrow) agent 130 provides integrated event tracking for funds and goods movement between registered sellers 120A–120N and registered purchasers 110A–110N.

At step 1501, and via communication 1401A, a bid submitted by registered purchaser B 110B is accepted. The purchaser B 110B and the seller B 120B need not communicate for this to happen. Any additional terms of the sale may be negotiated between registered purchaser B 110B and registered seller B 120B, communication 1401B. The processing (escrow) agent 130 is not a party to these communications and this step. Registered purchaser B 110B submits a payment request to the processing (escrow) agent 130 with an indication that funds should be escrowed, as depicted in communication 1408 and step 1508. Optionally, the seller may be required to consent to participation in the escrow transaction.

The Internet auction site at which the sale transaction originated can present a hyper-link to registered purchaser B 110B which connects registered purchaser B 110B to processing (escrow) agent 130. Or, registered purchaser B 110B may directly access the processing (escrow) agent 130 to direct payment or payment and escrow services. Selecting the hyper-link causes processing agent 130 to present a Web page to registered purchaser B 110B that contains data pertaining to the goods or services being purchased. The page may contain the seller's name, unique identifier, item or service description, payment amount, and payment date. This information is captured from the auction site. The Web page also includes a hyper-link to cause the transaction to be initiated. Registered purchaser B 110B must provide his unique identifier, and optionally, password, before the transaction can be processed. The Web page can include a field or fields for entry of this information. It should be understood that this Web page is also available when the auction site sale transaction between registered purchaser B 110B and registered seller B 120B is not an escrow transaction, but a sale transaction as described above, which results from a winning bid. Also, the Internet site can present to an unregistered user an option to become registered.

Processing (escrow) agent 130 stores the payment request in the database 1405 with a persistent indicator for "funds escrow", as depicted in communication 1410 and step 1510. The payment request is assigned a payment identifier which is also stored. The initial state of the indicator is marked as "submitted". This state triggers the next step.

Processing (escrow) agent 130 initiates a debit of funds from the account associated with registered purchaser B 110B, as depicted in step 1512 and communication 1412. This may be at a future date agreed upon by the parties to the transaction, including the on-line auction site. The state of the payment request stored in database 1405 is changed to "debit initiated," as depicted in communication 1415 and step 1515.

Once the debit has cleared, that is, funds have been credited to the escrow account, the state of the payment request stored in database 1405 is changed to "debit approved," as depicted in step 1518 and communication 1418. Optionally, the state of the payment request stored in database 1405 can be changed to "debit approved" after the predetermined period discussed above in relation to a sale transaction has lapsed. This state triggers the next step. Assuming the funds have cleared, or the period has lapsed, the processing (escrow) agent 130 notifies registered seller B 120B, preferably via e-mail, that the funds have been escrowed and that the seller should ship the goods, or provide the services, as depicted in step 1520 and communication 1420. This notification may contain the same product or services data that was captured from the auction site, the payment identifier, and a package identifier. The state of the payment request stored in database 1405 is changed to "seller notified to ship," communication 1421 and step 1521.

Registered seller B 120B ships the goods, or provides the services, to registered purchaser B 110B and optionally notifies the processing (escrow) agent 130 of the same. For shipment of goods, registered seller B 120B performs the optional notification by providing shipping information to the processing (escrow) agent 130, step 1523 and communication 1423. The shipping confirmation may include the identity of the shipping agent and the package identifier. The state of the payment request stored in database 1405 is changed to "shipping/performance confirmation received," communication 1425 and step 1525.

The processing (escrow) agent 130 may optionally transmit a notification to registered purchaser B 110B, preferably via e-mail, that the goods have been shipped, or that the services have been or are being performed, step 1528 and communication 1428. The state of the payment request stored in database 1405 in such a case is changed to "purchaser notified of shipment/performance," step 1530 and communication 1430.

Upon satisfactory receipt of the goods, or acceptable performance of the services, registered purchaser B 110B transmits notice of acceptance of the goods or services to the processing (escrow) agent 130, step 1533 and communication 1433. This may be via e-mail or other type communication, including registered purchaser B 110B directly accessing the purchasing (escrow) agent via the Internet 100. The state of the payment request stored in database 1405 is changed to "purchaser acceptance of goods/services received," communication 1435 and step 1535. This triggers the next step. If registered purchaser B 110B does not transmit notice of acceptance of the goods or services within a predetermined time after registered purchaser B 110B has been notified of shipment or performance, the state of the payment request may be changed to "purchaser acceptance of goods/services received," even though notification of acceptance has not been received, if optional step 1523 has been executed.

Processing (escrow) agent 130 initiates a debit of the funds from the escrow account at its own financial institution 150D, and a corresponding credit to registered seller B's account at financial institution 150E, step 1538 and communication 1438. The state of the payment request stored in database 1405 is changed to "funds credited to seller", step 1540 and communication 1440. This triggers the next step.

The purchasing (escrow) agent 130 notifies seller B 110B via e-mail that payment on behalf of the purchaser B 110B has been deposited in the seller's account, step 1543 and communication 1443. The state of the payment request stored in database 1405 is changed to "seller notified of funds crediting," step 1545 and communication 1445.

FIGS. 16 and 17A–C depict the communications and steps which occur when registered purchaser B 110B is not satisfied with the goods or services. After registered purchaser B 110B has been notified of shipment or performance, if registered purchaser B 110B receives the goods and is not satisfied, has not received them, is not satisfied with the services, or has not received the services, registered purchaser B 110B may choose to initiate communication with the seller about the problem, as depicted in communication 1601 and step 1701. Processing (escrow) agent 130 is not a party to this optional communication. Registered purchaser B 110B notifies the processing (escrow) agent 130 to place the transaction in a "hold" status pending resolution, step 1705 and communication 1605. This may be via e-mail or other communication, including by direct communication with the processing (escrow) agent 130 via the Internet 100. The state of the payment request stored in database 1405 is changed to "purchaser hold of transaction received," step 1708 and communication 1608. If the dispute is resolved between registered purchaser B 110B and registered seller B 120B, purchaser B 110B notifies processing agent 130 of the resolution and the hold is removed. Operations continue with step 1533 of FIG. 15B.

Figure 17A:
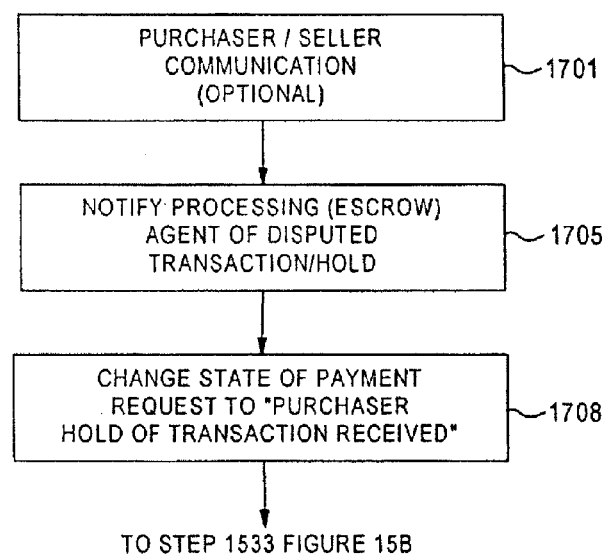
FIG. 17A is a flow chart showing the operations which are performed by the registered users and processing agent, in a second alternative, to effect an escrow transaction in accordance with the present invention.
Figure 17B:
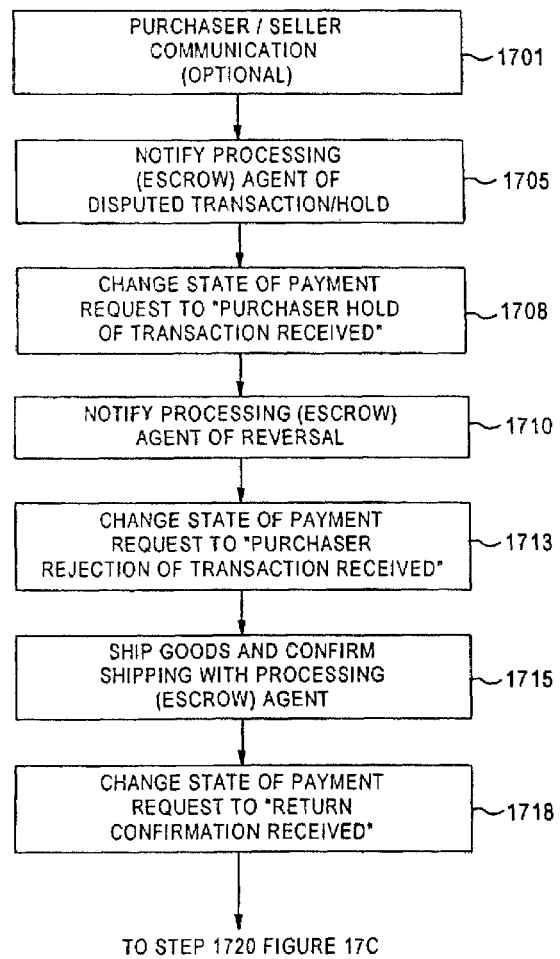
FIGS. 17B and 17C are flow charts showing the operations which are performed by the registered users and processing agent, in a third alternative, to effect an escrow transaction in accordance with the present invention.
Figure 17C:
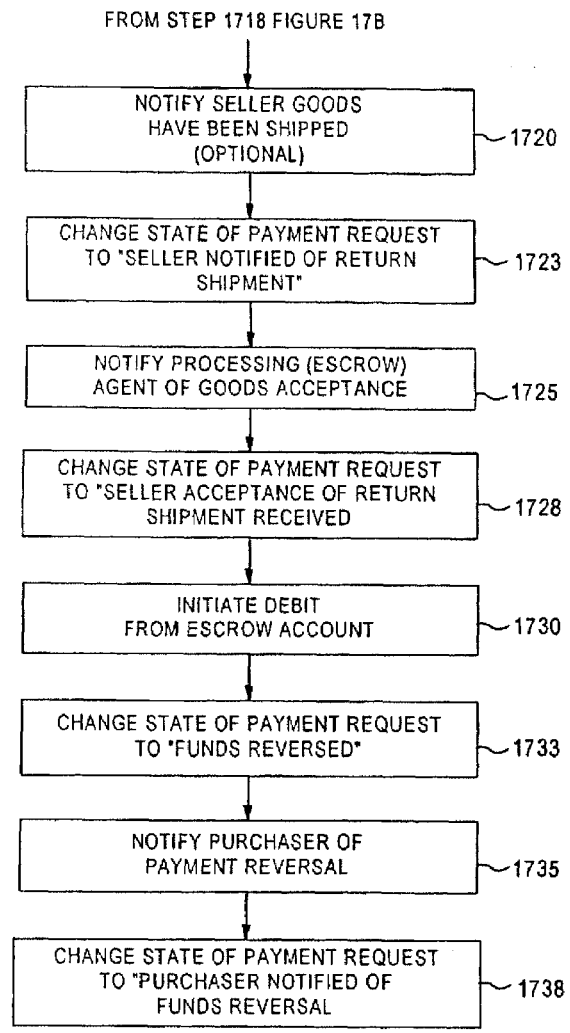

FIGS. 17B and 17C depict operations if the dispute is not resolved. Registered purchaser B 110B notifies the processing (escrow) agent 130 that the debit to the purchaser account should be reversed, communication 1610 and step 1710. This, as above, may be via e-mail or other communication, including by direct Internet 100 connection with the processing (escrow) agent 130. The state of the payment request stored in database 1405 is changed to "purchaser rejection of transaction received," step 1713 and communication 1613. For the sale of goods, registered purchaser B 110B returns the merchandise to registered seller B 120B and confirms shipping by providing shipping information to the processing (escrow) agent 130, step 1715, communication 1615. The state of the payment request stored in database 1405 is changed to "return shipping confirmation received," step 1718 and communication 1618. This triggers the next step. It should be understood that registered purchaser B 110B need not first place a hold on the transaction, registered purchaser B may direct a reversal of the transaction without directing the above-described hold.

The processing (escrow) agent 130 optionally notifies registered seller B 120B via e-mail that the goods have been shipped, communication 1620 and step 1720. The state of the payment request stored in database 1405 is changed to "seller notified of return shipment," step 1723 and communication 1623. Upon satisfactory receipt of the returned goods, registered seller B 120B notifies processing (escrow) agent 130 of acceptance of the goods, communications 1625 and step 1725. This may too be via e-mail or other type communication. The state of the payment request stored in database 1405 may be changed to "seller acceptance of return shipment received," communication 1628 and step 1728. If registered seller B 120B does not notify processing (escrow) agent 130 of acceptance of the returned goods within a predetermined time, the state of the payment request may be changed to "seller acceptance of return shipment received."

Processing (escrow) agent 130 initiates a debit of funds from the escrow account and a corresponding credit to registered purchaser A's account, step 1730 and communication 1630. The state of the payment request stored in database 1405 is changed to "funds reversed to purchaser," step 1733 and communication 1633. This funds reversal, however, may not be to the same account associated with the registered purchaser from which the funds were originally debited. The purchasing (escrow) agent 130 notifies registered purchaser B 110B, preferably via e-mail, that appropriate reversal of payment has been deposited in the account associated with registered purchaser B 110B, communication 1635 and step 1735. The state of the payment request stored in database 1405 is changed to "purchaser notified of funds reversal," step 1738 and communication 1638.

The above-described escrow transaction may be performed somewhat differently. Alternate operations will be referred to as payment-on-delivery transactions. In such transactions, a shipping agent takes on a more active role by providing tracking of the movement of goods to either of, or both of, the processing (escrow) agent 130 and registered seller B 120B. In payment-on-delivery transactions, an association between the payment identifier and the package identifier, both introduced above, is established and is utilized by the processing (escrow) agent 130 in determining when to release funds. The association may be established by a shipping agent, by a seller, or by the processing (escrow) agent 130.

Figure 20:
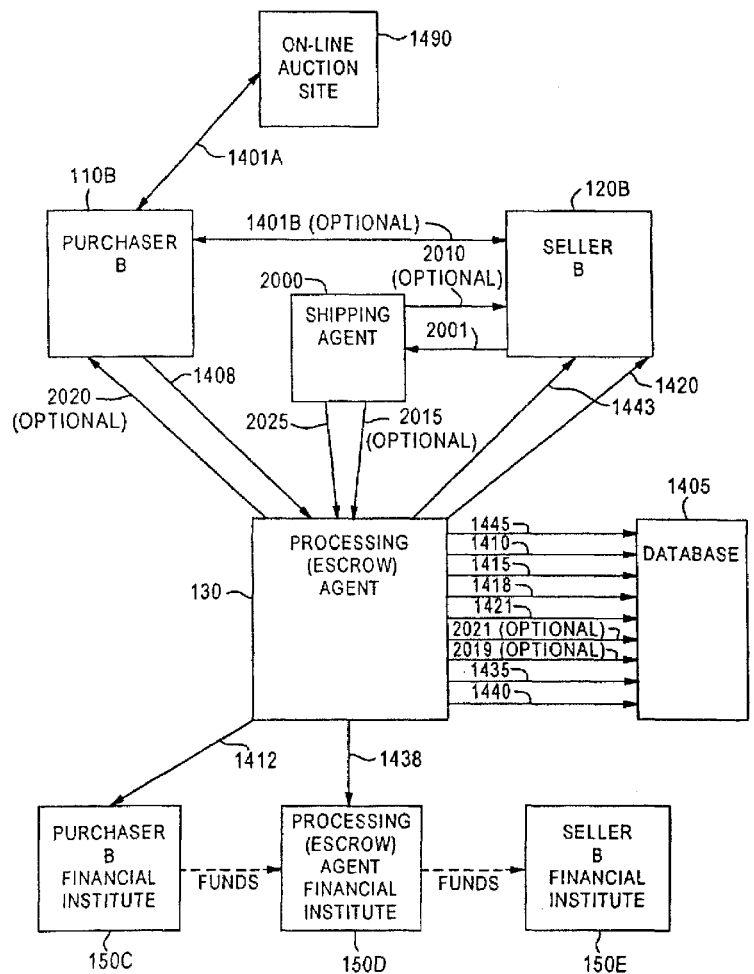
FIG. 20 depicts the communication between various registered users, a shipping agent, and the processing agent, in a first alternative, to effect a payment-upon-delivery transaction in accordance with the present invention.
Figure 21:
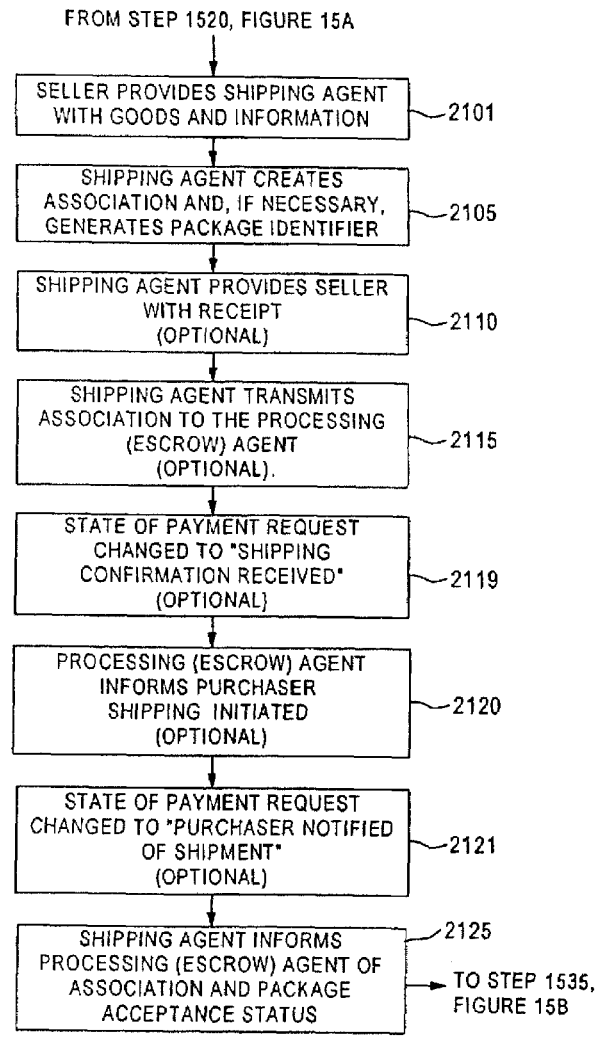
FIG. 21 is a flow chart showing the operations which are performed by the registered users, shipping agent, and processing agent, in the first alternative, to effect a payment-upon-delivery transaction in accordance with the present invention.

In a first alternative, the shipping agent initiates the association of the payment identifier and the package identifier and notifies the processing (escrow) agent 130 of the same. FIG. 20 depicts communications among the registered seller B 120B, registered purchaser B 110B, processing (escrow) agent 130, and a shipping agent 2000. The communications and processing to effect a payment-on-delivery transaction in this first alternative is the same as described above and depicted in FIG. 14 and FIG. 15 through step 1518. Thereafter, some of the aforementioned optional operations become mandatory and additional operations are introduced, as described below and depicted in FIG. 21, beginning at step 2101.

In step 1520, described above, the processing (escrow) agent 130 informs the registered seller B 120B of the payment identifier, and optionally the package identifier. If, at step 1520, the processing (escrow) agent 130 does not provide the registered seller B 120B with the package identifier, either the registered seller B 120B or the shipping agent 2000 can generate the package identifier. At step 2101, the seller provides the shipping agent 2000 with the goods, the identity of the processing (escrow) agent 130, the payment identifier, and optionally the package identifier if the shipping agent 2000 has not generated the package identifier. The identity and identifiers, shown transmitted via communication 2001, may be provided previous to, subsequent to, or concurrent with, the shipping agent 2000 actually taking possession of the goods for shipment. The communications between the registered seller B 120B and the shipping agent 2000 may be made orally, by hardcopy, or electronically, including on-line communications.

The shipping agent 2000 generates the package identifier, if necessary, and creates an association between the processing (escrow) agent 130, the payment identifier, and the package identifier, step 2105. The association links this information together in a database. Preferably, the shipping agent 2000 utilizes the package identifier as a delivery or tracking number. The association may be made concurrent with receipt of the information in step 2101, such as via an on-line communication while interacting with the registered seller B 120B, or subsequently, such as via an electronic file batch processing.

The shipping agent 2000 may optionally provide the registered seller B 120B with a receipt, which may include one of or both of the payment identifier and the package identifier, step 2110 and communication 2010.

Also optionally, the shipping agent 2000 may transmit the association between the payment identifier and the package identifier to the processing (escrow) agent 130, step 2115 and communication 2015. This may be an automatic transmission requiring no human involvement, such as via an electronic batch file or Application Program Interface (API), which is an in-session (real-time) interface between the shipping agent 2000 and the processing (escrow) agent 130. Or, the transmission may involve human intervention by the shipping agent 2000. This can include making the transmission via an on-line user interface or otherwise. In such a case, the processing (escrow) agent stores this information in database 1405, and the state of the payment request is changed to "shipping confirmation received," step 2119 and communication 2019.

Also optionally, the processing (escrow) agent 130 may inform the registered purchaser B 110B that shipping has been initiated, step 2120, if step 2119 is executed. In such a case, the state of the payment request in database 1405 is changed to "purchaser notified of shipment," step 2121 and communication 2021.

As will be understood by one skilled in the art, the shipping agent 2000 can electronically track the movement of the package from the moment of acceptance from the registered seller B 120B to the moment of delivery to the registered purchaser B 110B. Thus, at all times the shipping agent 2000 can know the location of the package. When the registered purchaser B 110B takes possession of the package, the shipping agent 2000 enters a notation of this into the tracking system maintained by the shipping agent 2000. This can be done wherever the actual transfer of possession occurs via the use of handheld data terminals or other devices. In a first notification scenario, known as a 'push', upon delivery of the package to the registered purchaser B 110B, the shipping agent 2000 transmits the association between the payment identifier and the package identifier, as well as an indication that the package has been delivered, to the processing (escrow) agent 130, step 2125 and communication 2025. As in the above-described optional transmission depicted in step 2115, this may be an automatic transmission requiring no human involvement, such as via an electronic batch file or Application Program Interface (API), which is an in-session (real-time) interface between the shipping agent 2000 and the processing (escrow) agent 130. Or, the transmission may involve human intervention by the shipping agent 2000. This can include making the transmission via an on-line user interface or otherwise. If optional step 2115 has been executed, the shipping agent 2000 need only transmit the delivery results. After the package has been delivered, and the processing (escrow) agent 130 has knowledge of the delivery, operations continue as described above and depicted in FIG. 15, step 1538.

In a second notification scenario, known as a 'pull', and available if optional step 2115 has been executed, the processing (escrow) agent 130 retrieves delivery results from the shipping agent 2000. This too may either be automatic, whereby the processing (escrow) agent 130 utilizes an on-line API provided by the shipping agent 2000, or retrieves delivery results via a batch pull of delivery confirmation files from the shipping agent 2000. Or, the retrieval of delivery results may involve human intervention, such that a representative of the processing (escrow) agent 130 accesses an on-line system of the shipping agent 2000, then updates information maintained by the processing (escrow) agent 130 either in batch or on-line mode. Preferably, data is pulled periodically from the shipping agent 2000. If the result of the pull is that the package has been delivered, operations continue with step 1538 of FIG. 15.

Figure 22:
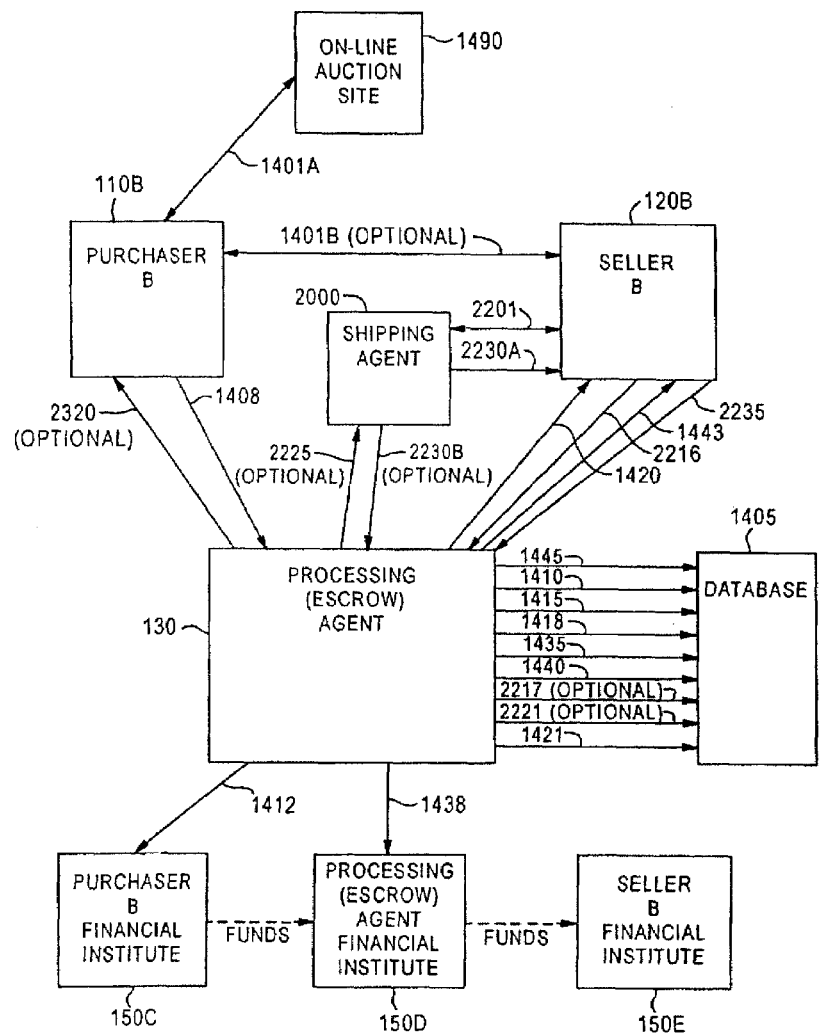
FIG. 22 depicts the communication between various registered users, a shipping agent, and the processing agent, in a second alternative, to effect a payment-upon-delivery transaction in accordance with the present invention.
Figure 23:
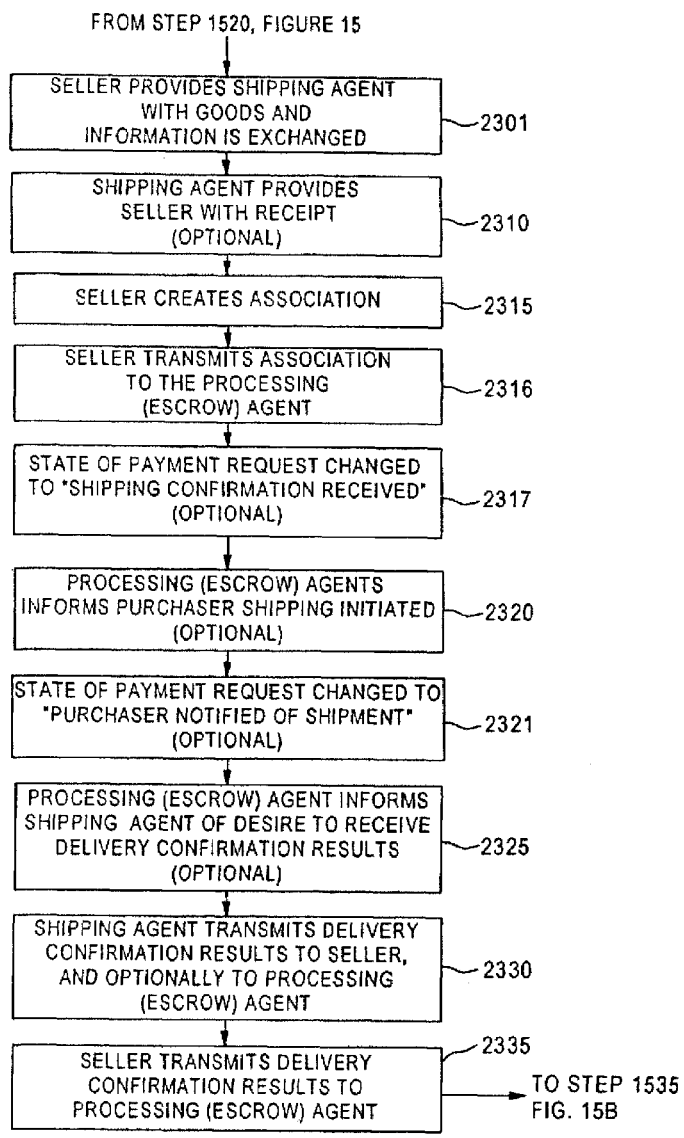
FIG. 23 is a flow chart showing the operations which are performed by the registered users, shipping agent, and processing agent, in the second alternative, to effect a payment-upon-delivery transaction in accordance with the present invention.

In a second alternative, whose communications and steps are depicted in FIGS. 22 and 23, the seller initiates the association of the payment identifier and the package identifier and notifies the processing (escrow) agent 130 of the same. In this second alternative, delivery results may directly flow between the shipping agent 2000 and the processing (escrow) agent 130, or they may flow through the registered seller B 120B. The processing to effect a payment-on-delivery transaction in this second alternative is the same as described above and depicted in FIG. 15 through step 1518. Thereafter, some of the aforementioned optional operations become mandatory and additional operations are introduced, as described below.

In step 1520, the processing (escrow) agent 130 informs the registered seller B 120B of the payment identifier and not the package identifier. In this second alternative, either the registered seller B 120B or the shipping agent 2000 can generate the package identifier. At step 2301, the registered seller B 120B provides the goods to the shipping agent 2000, and if necessary, also provides the package identifier. If not, the shipping agent 2000 generates the package identifier and notifies the registered seller B 120B of the package identifier. Communications between the registered seller B 120B and the shipping agent 200 are depicted via communication 2201.

The shipping agent 2000 may optionally provide the registered seller B 120B with a receipt, which may include one of or both of the payment identifier and the package identifier, step 2310.

The registered seller B 120B creates the association between the payment identifier and the package identifier, step 2315, and informs the processing (escrow) agent 130 of the identity of the shipping agent 2000 and the association between the payment identifier and the package identifier, step 2316 and communication 2216. This may be an automatic transmission requiring no human involvement, such as via an electronic batch file or Application Program Interface (API), which is an in-session (real-time) interface between the shipping agent 2000 and the processing (escrow) agent 130. Or, the transmission may involve human intervention by the shipping agent 2000. This can include making the transmission via an on-line user interface or otherwise. Optionally, the state of the payment request is changed to "shipping confirmation received," step 2317 and communication 2217.

Optionally, the processing (escrow) agent 130 may inform the registered purchaser B 110B that shipping has been initiated, step 2320 and communication 2220. In such a case, the state of the payment request in database 1405 is changed to "purchaser notified of shipment," step 2321 and communication 2221.

Also optionally, the processing (escrow) agent 130 may inform the shipping agent 2000, or the shipping agent 2000 and the registered seller B 120B, of a desire to directly obtain delivery results from the shipping agent 2000, step 2325 and communication 2225.

As in the first alternative, delivery results can either be pushed from the shipping agent 2000 or pulled from the shipping agent 2000. Furthermore, as the delivery results may flow directly between the shipping agent 2000 and the processing (escrow) agent 130, or through the registered seller B 120B, the delivery results may be pushed and/or pulled in multiple combinations of communications. The delivery results may be pushed directly to the processing (escrow) agent from the shipping agent 2000, or may be pushed to the registered seller B 120B from the shipping agent 2000. If pushed to the registered seller B 120B, they may then be pushed to the processing (escrow) agent 130, or they may then be pulled from the registered seller B 120 by the processing agent 130. The delivery results may be pulled directly from the shipping agent 2000 to the processing (escrow) agent 130, or may be pulled from the shipping agent 2000 by the registered seller B 120. If pulled to the registered seller B 120, they may then be pushed to the processing (escrow) agent 130 by the registered seller B 120B, or they may then be pulled from the registered seller B 120 by the processing agent 130.

When the delivery results are pushed by the shipping agent 2000, and the processing (escrow) agent 130 has not requested to directly obtain delivery results, upon delivery of the package to the registered purchaser B 110B, the shipping agent 2000 transmits an indication that the package has been delivered to the registered seller B 120B, step 2330 and communication 2230A. If the processing (escrow) agent 130 has requested to directly obtain delivery results, the shipping agent 2000, transmits the indication that the package has been delivered to the processing (escrow) agent 130, communication 2230B, not the registered seller B 120B. As in the above-described transmissions, these may be automatic transmissions requiring no human involvement, such as via an electronic batch file or Application Program Interface (API), which is an in-session (real-time) interface between two or more parties. Or, the transmissions may involve human intervention by the shipping agent 2000. This can include making the transmissions via an on-line user interface or otherwise.

When the delivery results are to be pulled from the shipping agent 2000 and the processing (escrow) agent 130 desires to directly obtain the delivery results, preferably the processing (escrow) agent 130 has informed the registered seller B 120B of this desire. In the direct pull scenario, the processing (escrow) agent 130 directly pulls delivery results from the shipping agent 2000, as discussed above, via communication 2230B. In a pull scenario in which the delivery results are pulled to the registered seller B 120B, the transmission is made via communication 2230A.

If the delivery results have been made known to the registered seller B 120B, either by pushing or pulling, in step 2335 and communication 2235, they are then made known to the processing (escrow) agent 130. This may either be a pushing from the registered seller B 120B to the processing (escrow) agent 130, or a pulling from the registered seller B 120B by the processing (escrow) agent 130. Once the processing (escrow) agent 130 obtains the delivery results, no matter if by pulling or pushing, or if directly or through the registered seller B 120B, and if the delivery results are that the package has been delivered, operations continue as described above and depicted in FIG. 15, step 1538.

Figure 24:
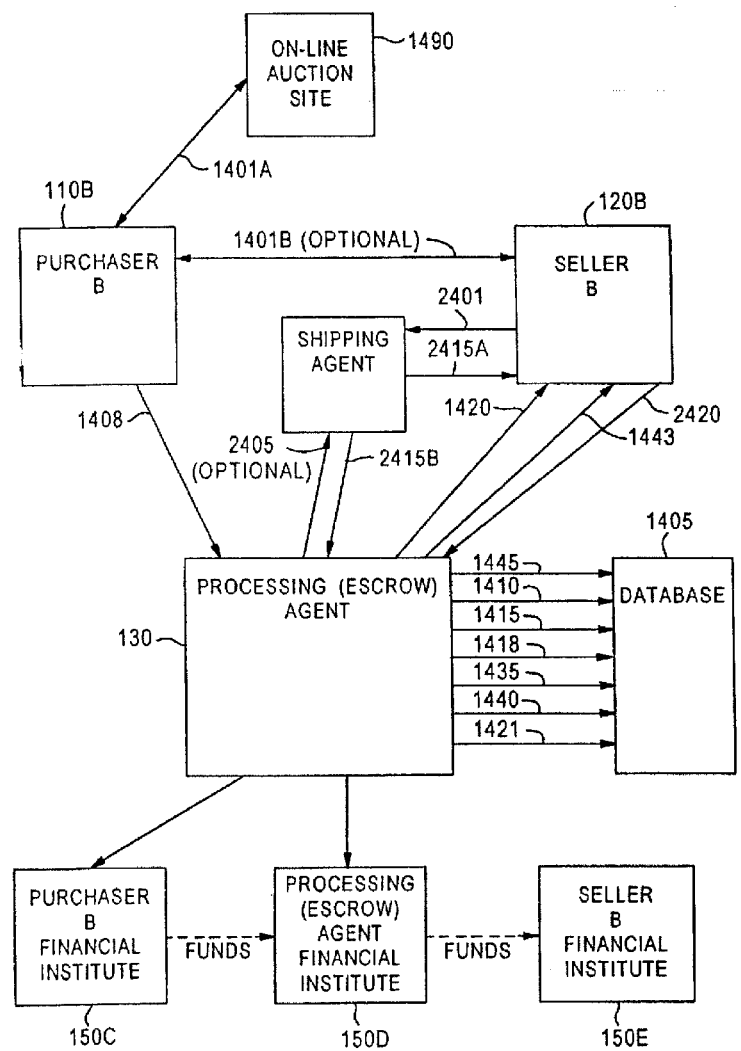
FIG. 24 depicts the communication between various registered users, a shipping agent, and the processing agent, in a third alternative, to effect a payment-upon-delivery transaction in accordance with the present invention.
Figure 25:
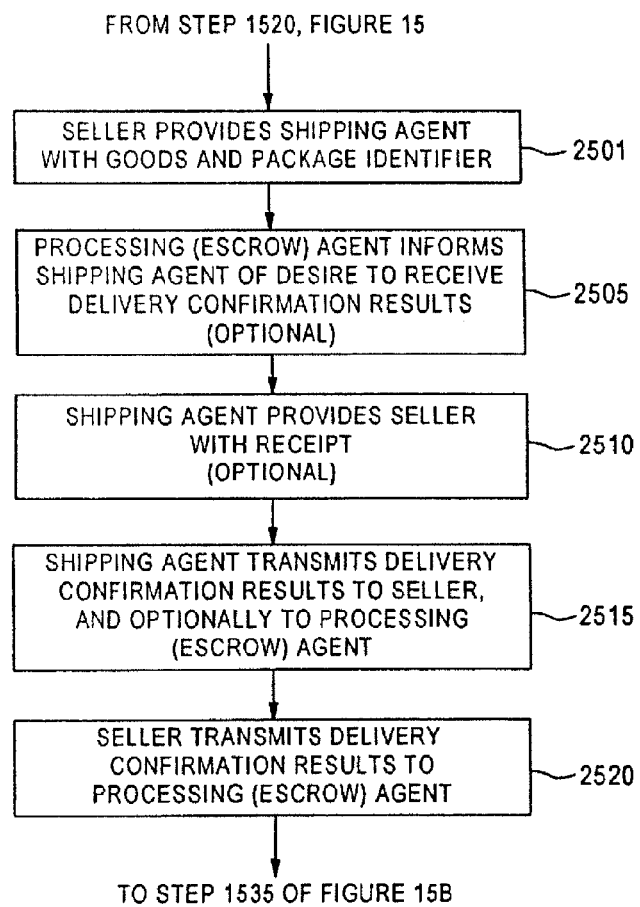
FIG. 25 is a flow chart showing the operations which are performed by the registered users, shipping agent, and processing agent, in the third alternative, to effect a payment-upon-delivery transaction in accordance with the present invention.

In a third alternative, shown in FIGS. 24 and 25, payment-on-delivery transaction, the processing (escrow) agent 130 makes the association of the payment identifier and the package identifier and thus need not be informed thereof by either the seller or the shipping agent 2000. Preferably, the association is made prior to step 1520. At step 1520 of FIG. 15, the processing (escrow) agent 130 informs the registered seller B 120B of the payment identifier and the package identifier. Registered seller B 120B provides the goods to the shipping agent 2000 and provides the shipping agent 2000 with the package identifier, step 2501. The package identifier is communicated via communication 2401. This may be either in person, including both an oral communication or via hardcopy, or in an electronic file format.

The processing (escrow) agent 130, as in the second alternative, may optionally inform the shipping agent 2000 of a desire to receive delivery results, step 2505 and communication 2405. This may be prior to, concurrent with, or subsequent to, the registered seller providing the goods and information to the shipping agent 2000. This may be done via any of the above-described communication methods.

The shipping agent 2000 may optionally provide the registered seller B 120B with a receipt, which may include the package identifier, step 2510.

As discussed in the second alternative, delivery results can either be pushed from or pulled from the shipping agent 2000. Also as discussed in the second alternative, delivery results may flow directly between the processing (escrow) agent 130 and the shipping agent 2000, or they may flow through the registered seller B 120B.

At step 2515, the delivery results are either pulled from or pushed from the shipping agent 2000. This may be to the processing (escrow) agent 130, or to the registered seller B 120B. If to processing (escrow) agent 130, the results are communicated via communication 2415B, and if to the registered seller B 120B, the results are communicated via communication 2415B.

As in the above-described transmissions, these may be automatic transmissions requiring no human involvement, such as via an electronic batch file or Application Program Interface (API), which is an in-session (real-time) interface between two or more parties. Or, the transmissions may involve human intervention by the shipping agent 2000. This can include making the transmissions via an on-line user interface or otherwise.

If the results flow through the registered seller B 120B, at step 2520 and via communication 2420, the delivery results then flow to the processing (escrow) agent 130. Also as in the second alternative payment-on-delivery transaction, the delivery results may be pushed to the processing (escrow) agent 130 by the registered seller B 120B, or they may be pulled from the registered seller B 120B by the processing (escrow) agent 130. When the package has been delivered, and the processing (escrow) agent 130 has knowledge of the delivery, operations continue as described above and depicted in FIG. 15, step 1538.

In each of the three payment-on-delivery alternatives, if either the processing (escrow) agent 130 or the seller provides the package identifier to the shipping agent 2000, a shipping label to be affixed to the goods which includes the package identifier and indicates postage or other shipping costs may also be generated by either the processing (escrow) agent 130 or the registered seller B 120B. The label may be generated by the registered seller B 120B if either the processing (escrow) agent 130 or the registered seller B 120B generates the package identifier. Or, the processing (escrow) agent 130 may generate the label and deliver it to either the registered seller B 120B or the shipping agent 2000 if the processing (escrow) agent 130 generates the package identifier. If the label is not generated by the shipping agent 2000, the processing (escrow) agent 130 will settle with the shipping agent 2000 for shipping costs. The processing (escrow) agent may or may not pass these costs on to the seller and/or purchaser.

If the processing (escrow) agent 130 generates the label, this may be a physical generation whereby the processing (escrow) agent 130 causes the label to be printed and physically delivered to the shipping agent 2000 or the seller. Or, the processing (escrow) agent 130 may virtually generate the shipping label and electronically deliver it to the seller or shipping agent 2000 for physical generation, i.e., printing.

Also, in each of the payment-on-delivery alternatives, the processing (escrow) agent 130 may also require, in addition to obtaining notification of delivery results generated by the shipping agent 2000, that the registered purchaser B 110B transmit a notice of acceptance of the goods to the processing (escrow) agent 130. In such a case, the credit to the seller account may not be initiated until this notice is received. And, as discussed above, after receiving delivery results generated by the shipping agent 2000, the processing (escrow) agent 130 may initiate a credit to the seller account after a predetermined period has elapsed, beginning upon obtaining the delivery results even if the notice from the registered purchaser B 110B has not been received. In this dual notice scenario, if the processing (escrow) agent 130 obtains a notice of delivery of the goods, but the notice of acceptance from the purchaser indicates that the goods are not satisfactory, the operations, described above, in returning the goods to the seller and crediting the purchaser account are executed, as depicted beginning at step 1710 of FIG. 17. It should also be understood, that the shipping agent 2000 may play an active role in funds movement in the return of unsatisfactory goods. In such a case, the above described notification of delivery results between various ones of the registered seller B 120B, shipping agent 2000, and processing (escrow) agent 130 are repeated, only with the registered purchaser B 110B acting in place of the registered seller B 120B.

The delivery results, no matter if pushed or pulled to the processing (escrow) agent 130, may be that the package was not delivered. This may be due to several reasons. For instance, the shipping agent 2000 may not be able to locate the registered is purchaser B 110B, or the registered purchaser B 110B may refuse to take possession of the package. In such a case, the shipping agent 2000 returns the package to the registered seller B 120B. Upon receiving delivery results indicating a non-delivered package, a credit is initiated to the account associated with registered purchaser B 110B, as depicted in step 1730 of FIG. 17. Or, the credit to the registered purchaser B 110B account may be made upon the package being delivered to the registered seller B 120B.

The above-described operations are also applicable in those situations where more than one shipping agent handles the goods. For example, a first shipping agent may receive the goods from the seller and perform the operations described above in any of the three alternatives up to actual delivery of the goods to the registered purchaser. Instead, delivery is made to a second shipping agent. The first shipping agent then receives confirmation of acceptance or non-acceptance by the registered purchaser of the goods by the second shipping agent. Thereinafter, operations continue with the notification(s) of acceptance described in the three alternative payment-on-delivery transactions.

As described above, the registered purchaser B 110B may not accept delivery of the package. The registered purchaser B 110B may accept delivery of the package and, in the presence of the shipping agent, inspect the goods contained therein. If the purchaser should not accept the goods, the shipping agent notifies the appropriate ones of the processing (escrow) agent 130 and/or registered seller B 120B of the non-acceptance, step 2125 of FIG. 21, step 2335 of FIG. 23, or step 2520 of FIG. 25. It should be understood that possession of the goods is not transferred to the registered purchaser B 110B, rather, the shipping agent 2000 returns the goods to the registered seller B 120B. Upon delivery of the goods back to the registered seller B 120B, the shipping agent 2000 transmits a notice to the processing agent that the goods have been returned to the seller. Or, the seller may transmit this notice to the processing (escrow) agent 130. Once the processing agent receives this notice, operations continue as described above and depicted in step 1728 of FIG. 17C.

A registered seller may also be a shipping agent. In such a situation, the shipping agent/registered seller may generate the payment identifier and the package identifier. The seller/shipping agent may transmit a payment collections file to the processing (escrow) agent 130. Thereinafter, the processing (escrow) agent 130 initiates the initial debit from the registered purchaser's account. After the processing (escrow) agent has collected funds from the purchaser, the processing (escrow) agent 130 may transmit an electronic remittance file to the shipping agent/registered seller.

While escrow and payment-on-delivery transactions have been detailed in relation to on-line auction transactions, it should be understood that processing agent 130 also may provide escrow and payment-on-delivery services for sale transactions between any registered users which arise from a non-auction sale.

In escrow and payment-on-delivery transactions, the final movement of funds, whether it be to the seller or back to the purchaser, are dependent upon a triggering event. This triggering event may be a receipt of a single notice from the purchaser, a receipt of a single notice from the seller, or a receipt of a single notice from the shipping agent. The triggering event may be a combination of a receipt of notices from both the shipping agent and purchaser, from both the seller and the purchaser, or from both the shipping agent and the seller. Also, the triggering event may be the elapsing of a time period. Thus, the processing (escrow) agent 130 can move funds obtained from a purchaser upon more than one triggering event, or set of triggering events.

This ability to move funds based upon a triggering event is not limited to escrow/payment-on-delivery transactions. The processing agent 130 can move funds associated with other types of transactions also upon the occurrence of triggering events. This ability rests in part on the processing agent 130 storing information associated with each action taken to complete each transaction it processes. The processing agent 130 operates under one or more set parameters of ordering rules, dependent upon the type of transaction being executed. Each step performed by the processing agent 130 to execute a given transaction type is dictated by one or more prior events, whether performed by the processing agent 130 or another entity.

A registered user who also issues bills can utilize yet another service of the processing agent 130. For those registered users who are presented bills by another registered user, the billing registered user can electronically present bills to these registered users through the processing agent 130. The registered user submits electronic bills to processing agent 130 and processing agent 130 forwards those bills via e-mail, or forwards notice of bill availability on a Web page maintained by processing agent 130, to the appropriate registered users. Thus, a registered user can electronically receive a bill from another registered user, and in turn can pay the registered user via the services of the processing agent 130, as described above. Processing agent 130 can also provide remittance information to a registered user being paid from an electronic bill. This information is captured from an electronically presented bill when a registered user directs that bill to be paid to another registered user.

For those registered users who are receiving payment from several registered users, processing agent 130 optionally combines the several payments into a single consolidated payment for credit to the registered user's account.

Likewise, a registered user who also receives bills from another registered user can electronically pay those bills using the services of the processing agent 130. Operations to pay a bill to another registered user is essentially the same as making a purchase payment to another registered user. A registered user paying a bill contacts processing agent 130, as in step 1305, FIG. 13, and transmits payment instructions to the processing agent 130. In this case, the payment instructions include an indication that the payment is for a bill issued by the registered user, including the paying registered user's account information with the billing registered user.

Processing agent 130 processes the transmitted payment information and stores a persistent indicator in memory 1170 that the transaction is a bill payment transaction. This may be stored in a database containing information relating to bill payment transactions. Processing continues as depicted in step 1316, FIG. 13.

As in step 1320B, processing agent 130 informs the registered billing user that the registered billing user has new funds available. This notification includes the name of the registered user paying the bill, and that registered user's account information with the registered billing user being paid. It should be understood that a registered user can pay a bill of another registered user even though that bill has not been electronically presented, as described above.

Another service of the processing agent 130 is electronic gift payments. A gift payment is an electronic monetary transfer between two registered users unrelated to a sale transaction. The recipient need not be registered for a registered donor to direct an electronic gift payment to the recipient. But, for the recipient to obtain the funds associated with the electronic gift payment, the recipient must register with processing agent 130 and become a member of the enclosed community 201. The recipient can use the gift funds in any manner the recipient desires. FIGS. 18A, 18B, 19A, 19B, and 19C depict the communications and steps for the processing agent 130 to effect an electronic gift payment. The processing agent 130 is the hub of a signaling infrastructure supported by a database 1805 stored in memory 1170 that maintains information about registered donors, recipients, and transactions between ones of the donors and recipients.

Figure 18A:
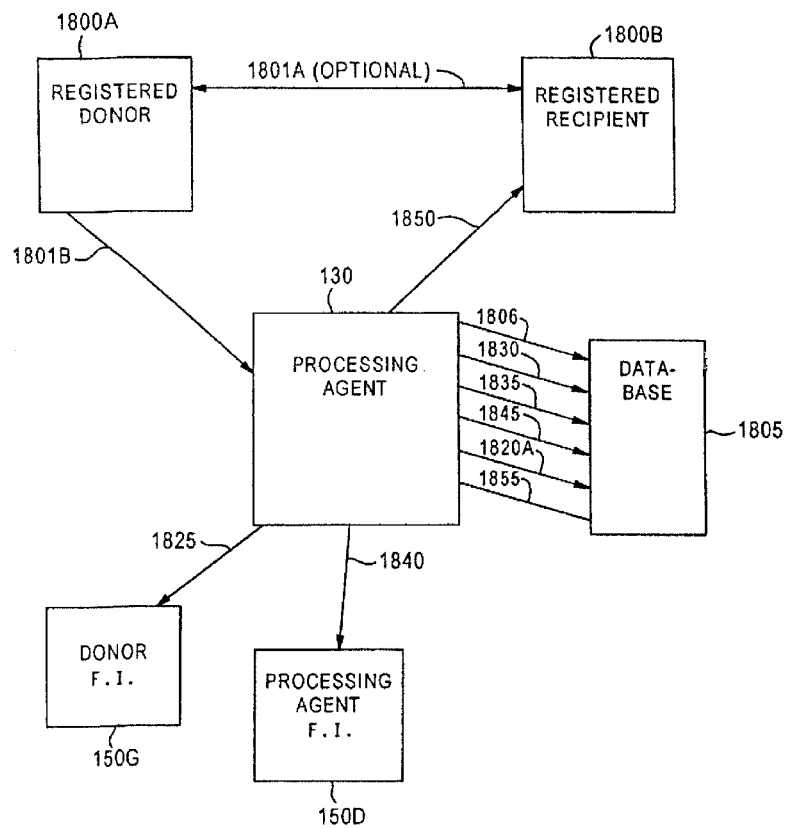
FIG. 18A depicts the communications between various registered users and the processing agent depicted in FIG. 2, in a first alternative, to effect a gift payment in accordance with the present invention.

At optional step 1901A, and via communication 1801A, the registered donor 1800A notifies the intended recipient of the gift. This is preferably via e-mail. Registered donor 1800A submits a gift payment request to the processing agent 130, depicted as step 1901B and communication 1801B. This may be via e-mail or other type communication, including via an on-line communication session. The gift payment request includes, at a minimum, the donor's unique identifier, optionally, password if required, the recipient's unique identifier, or e-mail address if the donor does not know the recipient's unique identifier or does not know if the recipient is a member of the enclosed community, and payment amount. The request can include other information, such as the recipient's name and other identifying information, a future payment date, and text the donor may wish to convey to the recipient. If the request is made via an on-line communication session, the request may not include the donor's unique identifier if the donor has previously supplied this during the on-line communication session. Processing Agent 130 stores the gift payment request in database 1805 with an appropriate persistent indicator for "gift payment," communication 1806 and step 1906. Processing agent 130 determines if the recipient is a registered member of the enclosed community 201, step 1910. If, as shown in FIG. 18A, the recipient is registered, at step 1920A and via communication 1820A the initial state of the stored gift payment request is marked "submitted for enrolled recipient." This triggers the next step.

The processing agent 130 initiates a debit of funds from the account associated with the registered donor 1800A maintained at financial institution 150G, step 1925 and communication 1825. The state of the gift payment request stored in database 1805 is changed to "debit initiated," step 1930 and communication 1830.

Once the corresponding credit has been made to the processing agent's 130 account, the state of the payment request stored in database 1805 is changed to "debit approved," communication 1835 and step 1935. This state triggers the next step.

Processing agent 130 may automatically initiate a debit of funds from its own account, shown here as at financial institution 150D, but it could be any financial institution, step 1940 and communication 1840, and a corresponding credit to the registered recipient's account prior to notifying the recipient of the gift payment. In such a case, the state of the payment request stored in database 1805 is changed to "funds credited to recipient," communication 1845 and step 1945. This triggers the next step.

Processing agent 130 notifies the registered recipient 1800B via e-mail that gift funds have been deposited into the recipient's account, step 1950 and communication 1850, preferably via e-mail. The notice can include the donor's name, e-mail address, and any donor specified text. The state of the gift payment request stored in database 1805 is changed to "recipient notified of funds crediting," communication 1855 and step 1955.

The gift payment may not automatically be credited to the registered recipient's account. In such a case, the notification to the recipient may include a hyper-link, which when followed, presents a web page created by the processing agent 130 to the recipient through which the registered recipient 1800B must provide his unique identifier. This initiates the credit to the recipient's account. Accordingly, the state of the gift payment request is changed to "recipient notified of funds availability" when the notice is sent. And, then it is changed to "funds credited to recipient" after the hyper-link is followed, the registered recipient 1800B provides his unique identifier, and the credit to the recipient's account is initiated.

Figure 18B:
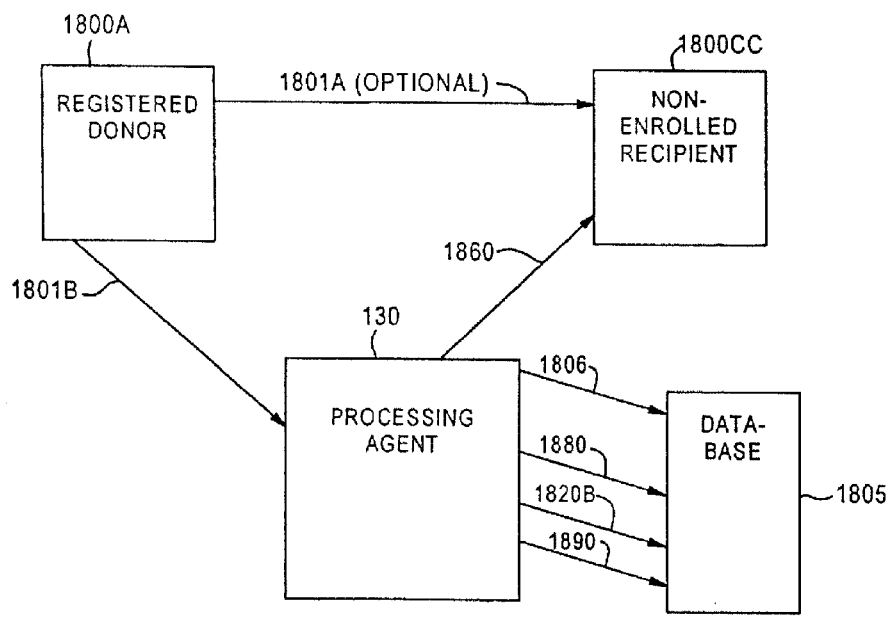
FIG. 18B depicts the communications between various registered users and the processing agent depicted in FIG. 2, in a second alternative, to effect a gift payment in accordance with the present invention.
Figure 19A:
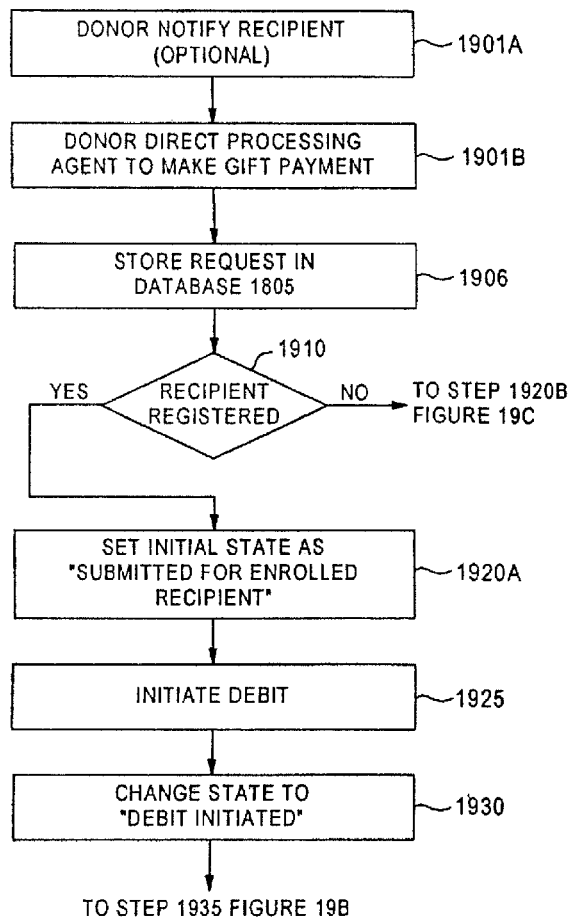
FIGS. 19A and 19B are flow charts showing the operations which are performed by the registered users and processing agent, in a first alternative, to effect a gift payment in accordance with the present invention.
Figure 19B:
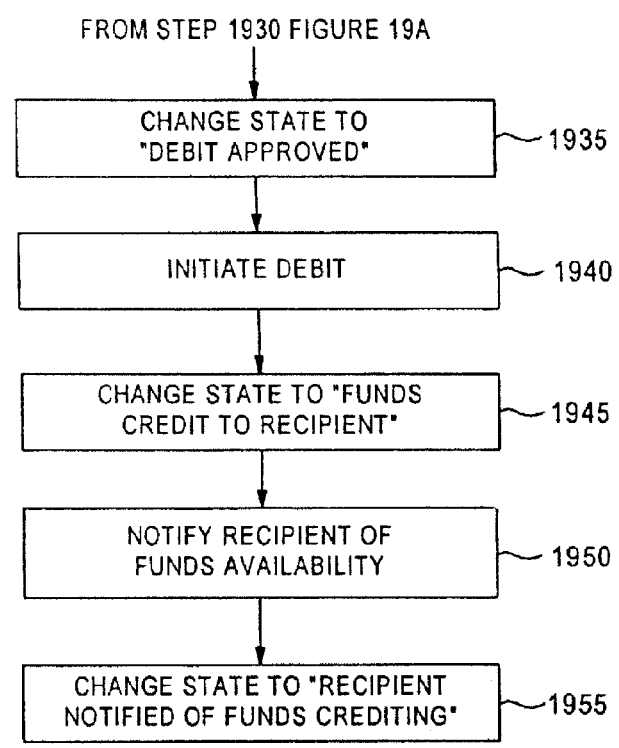
Figure 19C:
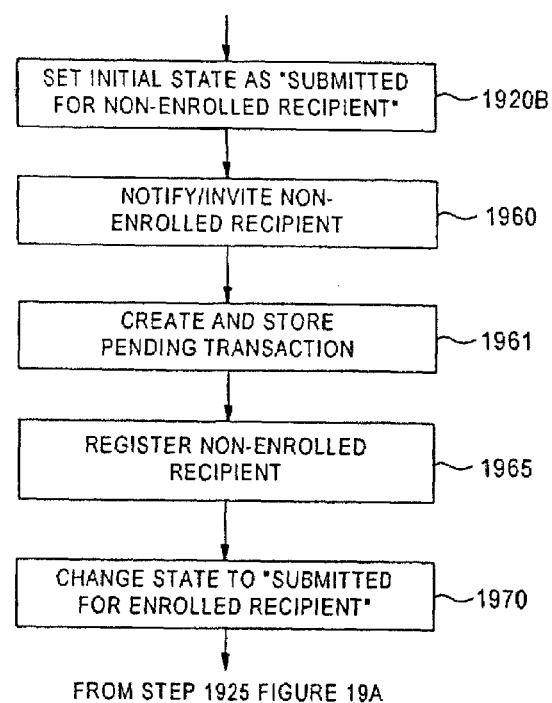
FIG. 19C is a flow chart showing the operations which are performed by the registered users and processing agent, in a second alternative, to effect a gift payment in accordance with the present invention.

If the operations of step 1910 determine that the recipient is unregistered, the operations and communications depicted in FIGS. 19C and 18B are executed. Following step 1910 of FIG. 19A, the initial state of the stored gift payment request is marked as "submitted for non-enrolled recipient," step 1920B and communication 1820B. This triggers the next step.

A notice is delivered to the non-enrolled recipient 1800C, preferably via e-mail, that an electronic gift payment is available and that the non-enrolled recipient must become a registered member of the enclosed community 201 to receive the gift payment, communication 1860 and step 1960. This communication preferably includes at least the name and e-mail address of the registered donor. It may also include the amount of the electronic gift payment and any donor specified text.

A pending debit transaction is created against the donor's account and stored in database 1805, step 1961 and communication 1880. This includes the registered donor's name, unique user identifier, gift payment amount, and date gift payment transaction initiated by the registered donor.

If the non-enrolled recipient chooses to enroll, the above-described registration procedures are followed to register non-enrolled recipient 1800C, step 1965. Preferably, enrollment is initiated via a hyper-link, or based upon a token contained in, an e-mail sent in communication 1860.

Once the recipient is registered, the state of the gift payment request is changed to "submitted for enrolled recipient," step 1970 and communication 1870. Processing continues as depicted in step 1925 of FIG. 19A.

Alternatively, the donor's account may be debited prior to communication 1860 being sent to the recipient. In such a case, as soon as funds are credited to the processing agent's 130 account and the recipient has enrolled, the recipient's account is credited.

If, after a predetermined period, the non-enrolled recipient does not enroll, the gift payment will expire. Processing agent 130 notifies the registered donor via e-mail that the recipient has not enrolled and that the transaction is cancelled. If the donor's account has been debited, a credit to the donor's account from the processing agent's 130 account will be initiated.

Another service offered by the processing agent 130 is electronic gift certificates. This service is similar to electronic gift payments. However, instead of donating cash, a registered donor can donate a gift certificate. The electronic gift certificate is redeemable via a purchase or purchases made from one or more registered sellers. Or, the electronic gift certificate may be redeemable for free merchandise from one or more registered sellers. The electronic gift certificate may only be redeemable with purchases made from the donor. Or, for free merchandise only from the donor. As in electronic gift payments, the recipient must be a registered member of the enclosed community to redeem the certificate, but not to receive the certificate.

Figure 26:
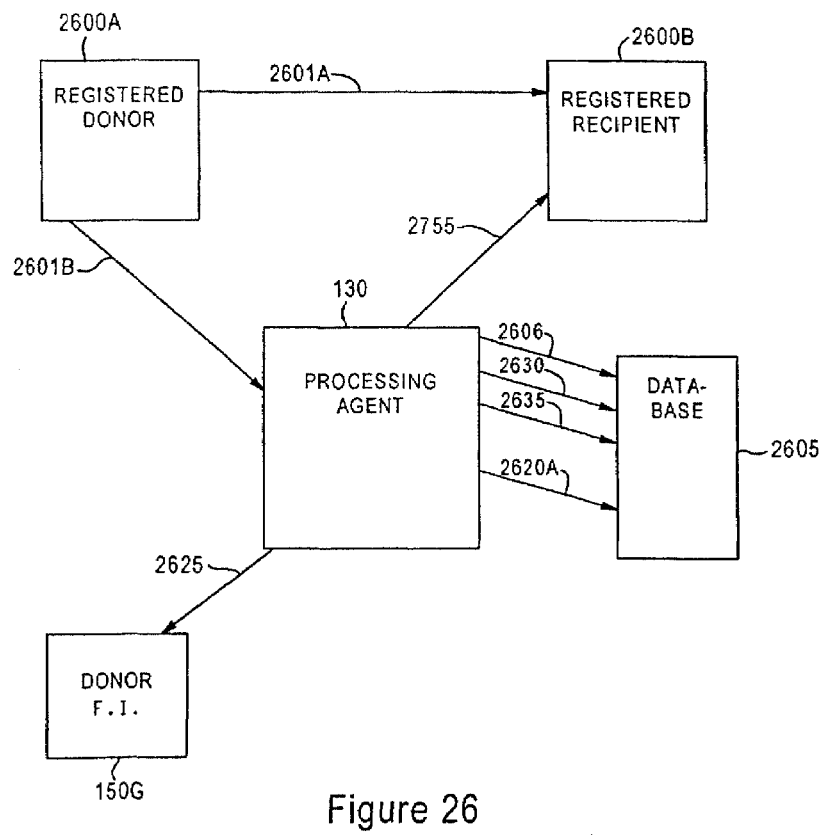
FIG. 26 depicts the communications between various registered users and the processing agent depicted in FIG. 2, in a first alternative, to effect an electronic gift certificate donation in accordance with the present invention.
Figure 27A:
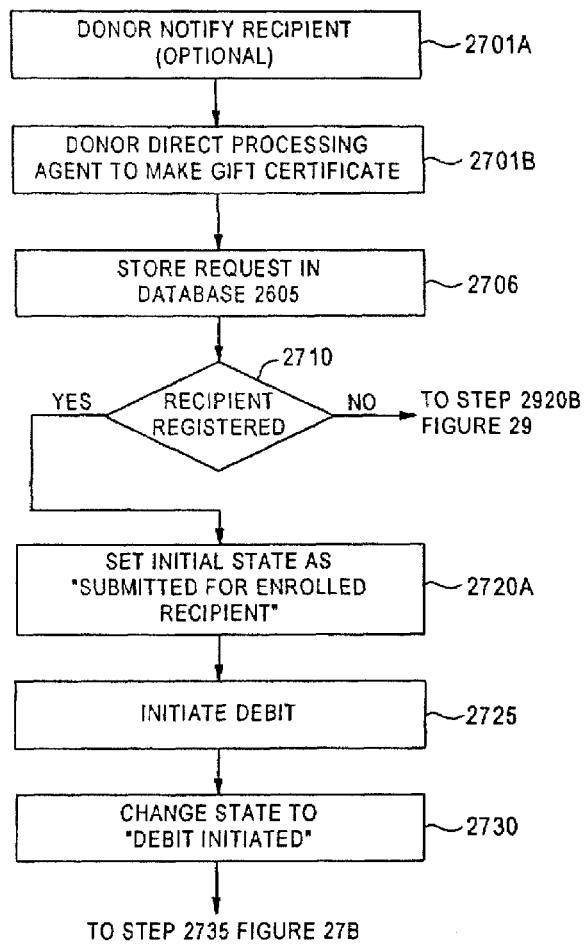
FIGS. 27A and 27B are flow charts showing the operations which are performed by the registered users and processing agent, in a first alternative, to effect an electronic gift certificate donation in accordance with the present invention.
Figure 27B:
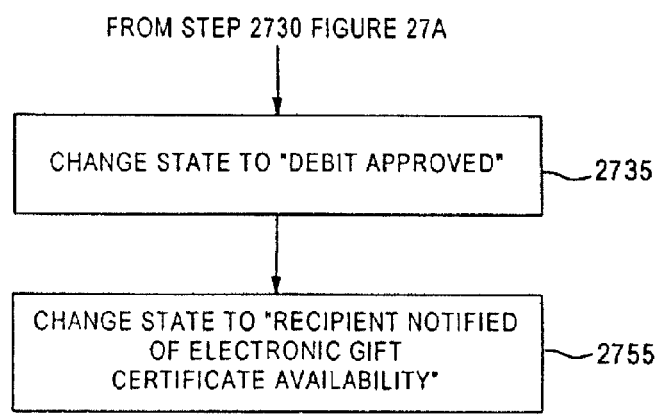

FIGS. 26–29 depict the communications and steps for the processing agent 130 to effect a donation of an electronic gift certificate. At optional step 2701A, and via communication 2601A, the registered donor 2600A may notify the intended recipient of the gift. This is preferably via e-mail. A gift certificate request is sent by the donor to the processing agent 130, depicted as step 2701B and communication 2601B. This can be via e-mail or other type communication, including via an on-line communication session. The gift certificate request includes at least the same information required to make a gift payment request. Processing agent 130 stores the gift certificate request in database 2605 with an appropriate persistent indicator for "gift certificate," communication 2606 and step 2706. Processing agent 130 determines if the recipient is a registered member of the enclosed community 201, step 2710. If, as shown in FIG. 26, the recipient is registered, at step 2720A and via communication 2620A, the initial state of the stored gift certificate request is marked as "submitted for enrolled recipient." This triggers the next step.

The processing agent 130 may initiate a debit of funds from the account associated with the registered donor 2600A maintained at financial institution 150G, step 2725 and communication 2625. The state of the gift payment request stored in database 2605 is changed to "debit initiated," step 2730 and communication 2630.

Once the corresponding credit has been made to the processing agent's 130 account, the state of the gift certificate request stored in database 2605 is changed to "debit approved," communication 2635 and step 2735. This state triggers the next step.

Alternatively, the processing agent 130 may not initiate a debit of funds from the account associated with the registered donor 2600A. In such a case, an indication is stored in the database 2605 of the amount of the electronic gift certificate. In this case, operations continue with step 2755.

Processing agent 130 notifies the registered recipient 2600B, preferably via e-mail, that the electronic gift certificate is available. The state of the payment request is changed to "recipient notified of electronic gift certificate availability", communication 2655 and step 2755. The notification may include a hyper-link, as discussed above in notification of an electronic gift payment, that the user must follow and thereby identify himself to the processing agent 130.

The processing to effect payment to a registered seller from the registered purchaser using an electronic gift certificate is the same as the above-discussed purchase transaction, only with the purchase price offset by the amount of the electronic gift certificate, if the registered donor's account has been debited. If the donor's account has not been debited, the electronic gift certificate will only be usable to offset a purchase price of a purchase made from the registered donor.

Database 2605 may store information including the identity of the registered seller or sellers which will accept the gift certificate as payment, the amount of funds available from the gift certificate, including decrementing this amount as the gift certificate is used, any expiration date of the gift certificate, and optionally a threshold at which remaining funds are released as a cash gift payment to the recipient of the gift certificate.

In yet another alternative, the registered donor may be the processing agent 130. In such a case, funds in the amount of the electronic gift certificate will not be debited from the account associated with the processing agent 130, as in step 2725 above. Whenever a registered recipient 2600B directs payment to be made to a registered seller, which may be the processing agent 130, funds in the amount of the purchase, less the amount of the gift certificate, will be debited from the account associated with the registered recipient 2600B. The electronic gift certificate/offset amount of the purchase price will be either paid by the processing agent 130, or upon agreement with the registered seller, waived by the registered seller.

Figure 28:
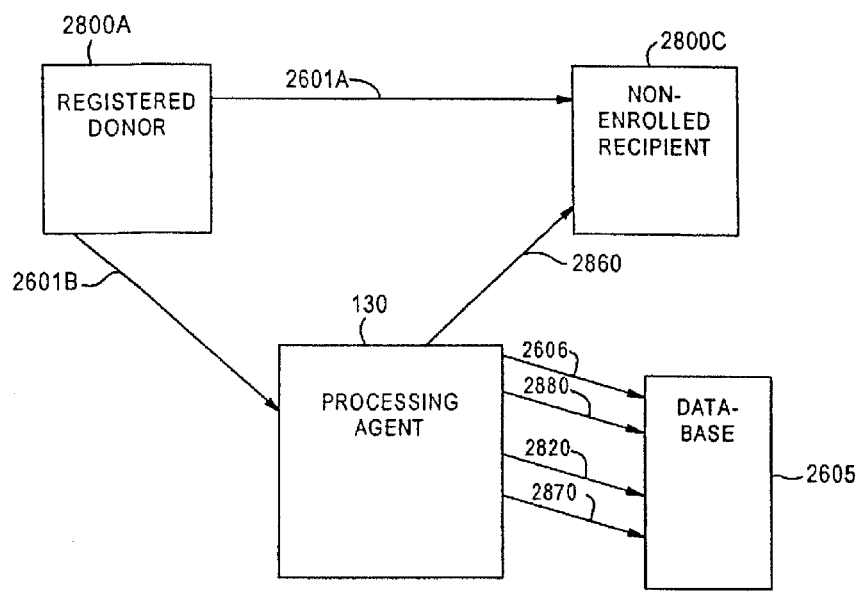
FIG. 28 depicts the communications between various registered users and the processing agent depicted in FIG. 2, in a second alternative, to effect an electronic gift certificate donation.
Figure 29:
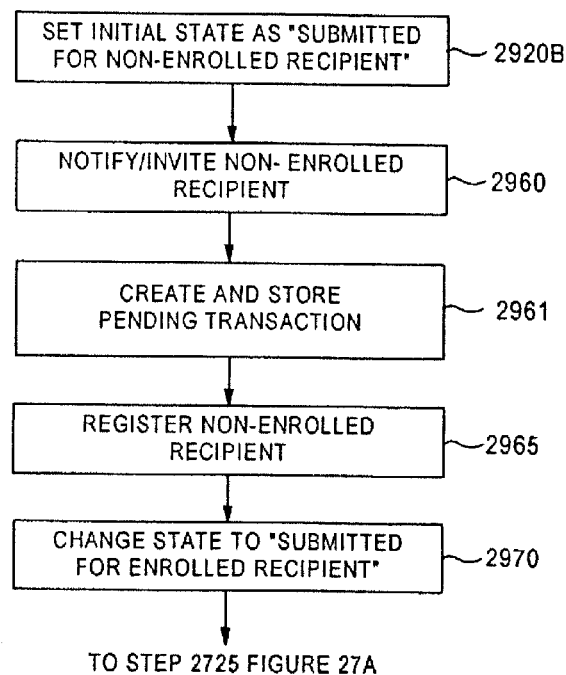
FIG. 29 is a flow chart showing the operations which are performed by the registered users and processing agent, in a second alternative, to effect an electronic gift certificate donation in accordance with the present invention.

If the operations of step 2710 determine that the recipient is unregistered, the operations and communications depicted in FIGS. 28 and 29 are executed. Following step 2710 of FIG. 27, the initial state of the stored electronic gift certificate request is marked as "submitted for non-enrolled recipient," step 2920B and communication 2820B. This triggers the next step.

A notice is delivered to the non-enrolled recipient 1800C, preferably via e-mail, that an electronic gift certificate is available and that the non-enrolled recipient must become a registered member of the enclosed community 201 to receive the electronic gift certificate, communication 2860 and step 2960. This communication preferably includes at least the name and e-mail address of the registered donor.

If the registered donor's account is to be debited, a pending debit transaction is created against the donor's account and stored in database 1805, step 2961 and communication 2880. This can include, in addition to other information, the registered donor's name, unique user identifier, gift certificate amount, and date the gift certificate request is initiated by the registered donor.

If the non-enrolled recipient chooses to enroll, the above described registration procedures are followed to register the non-enrolled recipient 1800C, step 2965.

Once the recipient is registered, the state of the gift certificate request is changed to "submitted for enrolled recipient," step 2970 and communication 2870. Processing continues as depicted in step 2725 of FIG. 27. If the donor's account is not to be debited, operations continue with step 2755. Alternatively, if the donor's account is to be debited to fund the electronic gift certificate, the account may be debited prior to the recipient registering.

If, after a predetermined period, the non-enrolled recipient does not enroll, the gift certificate will expire. Processing agent 130 notifies the registered donor, preferably via e-mail, that the recipient has not enrolled and that the transaction is cancelled. And, as above, if the recipient does not register, the donor's account will be credited if it was debited prior to notifying the recipient of the electronic gift certificate.

In yet another alternative, if the donor's account is to be debited, the amount of the electronic gift certificate may not be debited from the account associated with the registered donor 2600A until the registered recipient 2600B elects to use the electronic gift certificate.

The enclosed community 201 grows by adding registered users. A registered user may invite an unregistered user to join the enclosed community 201. The registered user only need provide the e-mail address of an unregistered party, and optionally the party's name, and processing agent 130 invites the unregistered user to join, preferably via an e-mail communication. The processing agent 130 may present to the registered user a Web page on which to enter the invitation information, such as the e-mail address and name of the unregistered user. It should be understood that a registered user may combine an invitation to another party to join the enclosed community 201 along with an electronic gift payment/certificate, as discussed above, to entice the party to become a member of the enclosed community 201.

The processing agent 130 can combine delivery of an electronic gift payment with delivery of an electronic greeting card (e-card). Thus, a registered user is not only able to send a gift via e-mail, but also able to send an electronic greeting card along with the gift. The e-card itself, or the message that provides notification of the link to follow to receive the e-card, can serve to inform a recipient of a gift payment.

In a first alternative, the processing agent 130 performs all functions necessary to deliver an e-card with a gift attached. The processing to send an e-card with an electronic gift payment is much like the above-described processing to send only an electronic gift payment, and as such, the following processing will be described with reference to the figures relating to electronic gift payments.

A registered user submits a request to the processing agent 130 to send an e-card with an electronic gift payment. The processing agent 130 stores a selection of e-cards from which a registered user can choose in memory 1170. The processing agent 130 presents this selection to the registered user. The functionality to present a selection of electronic greeting cards will be understood by one skill in the art, and as such will not be described in detail here. Also as will be understood by one skilled in the art, the registered user selects a card and submits this selection to the processing agent 130, along with any text the user may specify to be included in the e-card.

As in step 1901B of FIG. 19A, the registered user must provide at least his unique identifier, optionally, password if required, the recipient's unique identifier, or e-mail address, and payment amount. This information may be supplied prior to the selection of an e-card, with the selection of an e-card, or subsequent to selection of an e-card. Processing agent 130 stores the e-card request in database 1805 with an appropriate persistent indicator of "gift payment with e-card," as in step 1906.

The processing agent 130 determines if the recipient is a registered member of the enclosed community 201, as in step 1910. If the recipient is registered, the initial state of the stored gift payment with e-card request is marked "submitted for enrolled recipient." This triggers the next step.

As in steps 1925 and 1930, the processing agent 130 initiates a debit of funds from a donor's account and the state of the gift payment with e-card request is changed to "debit initiated." And, also as above, once the corresponding credit has been made to the processing agent's 130 account, the state of the request is changed to "debit approved."

Once the corresponding credit is made to the processing agent's 130 account, the e-card is sent via e-mail to the recipient. An enrolled recipient's e-mail address will be known to the processing agent 130. The presentation of the e-card may be accomplished in one of at least two ways, as will also be understood by one skilled in the art. In a first way, the e-mail message sent to the recipient may comprise the entire e-card. That is, the e-mail message is the e-card. Or, in a second way, the e-mail may contain a hyper-link back to the processing agent 130. By following this link, the e-card is displayed to the recipient via a unique web page.

The contents of the e-card, whether presented to the recipient in the first way or the second way, inform the recipient that he has received a gift, as well as convey any additional text specified by the donor. The e-card may contain text informing the recipient of the amount of the gift payment and the identity of the donor.

The movement of funds to a registered recipient can take place at least two ways. In a first way, a credit to the registered recipient's account, from funds in the processing agent's 130 account, can be initiated before or concurrent with the sending of the e-card to the recipient. As described above, the state of the request is changed to "funds credited to recipient" upon this crediting. In such a case, the e-card also informs the recipient that funds have been deposited into his account. When the e-card is sent to the recipient, the state of the request is changed to "recipient notified of funds crediting."

In a second way, the e-card includes a hyper-link which, as above, when followed by the registered recipient, initiates the debit/credit pair after the recipient has identified himself to the processing agent 130. Thus, the debit from the processing agent's 130 account is not initiated until after the recipient receives the e-card and follows the link. If the funds move in the second way, the state of the request is changed to "recipient notified of funds availability" upon the e-mail being sent. Upon the recipient following the hyper-link, identifying himself, and the credit being initiated to the recipient's account, the state of the request is changed to "funds credited to recipient."

If the processing agent 130 determines that the recipient is unregistered, the initial state of the request is set as "submitted for non-enrolled recipient," as in step 1920B above. The debit from the donor's account may be initiated prior to, or concurrent with, the sending of the e-card to the unregistered recipient.

The e-card sent to an unregistered recipient includes a notice that an electronic gift payment is available and that the recipient must register to receive the gift payment. The e-card can include a hyper-link, which when followed, presents an enrollment page to the unregistered recipient. Upon successfully registering, the recipient can obtain the gift payment.

If the debit from the donor's account is to be initiated after the recipient registers, a pending debit transaction is created against the donor's account, as in step 1961. Once the recipient successfully registers, the state of the request is changed to "submitted for enrolled recipient," as in step 1970. Processing then continues as described above to move funds from the donor's account into the recipient's account.

If the debit from the donor's account is initiated, and the corresponding credit to the processing agent's 130 account has been made, prior to the user becoming successfully registered, the debit from the processing agent's 130 account to the recipient's account can be initiated immediately upon successful registration. If the unregistered user does not successfully register, the funds debited from the donor's account will be credited back to the donor's account. As discussed above, funds may be credited back to the donor's account if a predetermined amount of time lapses and the recipient is not yet registered.

In a second alternative to deliver an e-card with an electronic gift payment, the processing agent 130 works in conjunction with another entity, which may be a sponsor, to offer e-cards with gift payments. The other entity will be referred to herein as an e-card site. An e-card site offers the service of sending electronic greeting cards. In a first scenario in the second alternative, the e-card site presents an option to a network user sending an e-card to send a gift payment with the e-card. The processing agent 130 performs the functions to execute the electronic gift payment, while the e-card site performs the functions to create and deliver the e-card.

The e-card site first performs the functions necessary to deliver an e-card to the recipient, as will be understood by one skilled in the art. This includes presenting the selection of e-cards to the donor and receiving information from the donor, such as the selected e-card, the recipient's email address, and any additional text the donor wishes included with the e-card. Additionally, the e-card site may receive the payment amount specified by the donor.

Upon the donor selecting the option to attach a gift payment presented by the e-card site, the processing agent 130 performs the functions necessary to include the electronic gift payment. A hyper-link may be presented to the donor directing the donor to the processing agent 130, or the e-card site may establish a communication session with the processing agent 130 via an API. The e-card site may transmit some or all information associated with the e-card to the processing agent 130. This can include information about the donor and/or the recipient maintained by the e-card site, and the payment amount.

If the e-card site provides information about the donor, the processing agent 130 determines if the donor is registered from this information. If no donor information is provided by the e-card site, the donor either provides his unique identifier to the processing agent 130, else he registers. If the e-card site provides recipient information, the processing agent 130 then determines if the recipient is registered. Else, the donor may be required to transmit to the processing agent information identifying the recipient, such as the recipient's unique identifier, or the recipient's e-mail address. The donor will provide the payment amount to the processing agent 130 if not provided to the processing agent 130 by the e-card site.

If the recipient is registered, the processing agent 130 informs the e-card site that the recipient is registered. The e-card site then includes in the e-card the appropriate information, discussed above, to be included in an e-card for a registered recipient. If this includes a hyper-link to initiate the credit to the recipient's account, it should be understood that this will be a hyper-link back to the processing agent 130. The particular information to be included in the e-card may be provided by the processing agent 130 to the e-card site.

The e-card site sends the e-card to the recipient via e-mail. As discussed above, the e-mail may be the entire e-card, or the e-mail may include a hyper-link back to the e-card site.

If the processing agent 130 determines that the recipient is unregistered, the processing agent 130 informs the e-card site of this and the e-card site includes the appropriate text and hyper-link, described above, for an unregistered recipient in the e-card. The particular information may be supplied by the processing agent 130 to the e-card site.

In a second scenario in the second alternative, the processing agent 130 controls the channel of communication with the recipient. That is, the processing agent 130 sends the e-card to the recipient. In such a scenario, the e-card site forwards the information pertaining to the e-card, and perhaps the e-card itself, to the processing agent 130. Thereinafter, the processing agent 130 performs the above-described functions to attach a gift payment and then sends the e-card to the recipient.

As should be apparent, the processing agent 130 also provides the functionality to include an electronic gift certificate with an e-card. The processing to include an electronic gift certificate with an e-card, in either the first or the second alternatives, is essentially the same as that of including an electronic gift payment. Instead of requesting an electronic gift payment, a donor requests an electronic gift certificate. Thereinafter, the processing to attach an electronic gift certificate to an e-card is the same as to attach an electronic gift payment to an e-card. The processing agent 130 or the e-card site may present an option to send either an electronic gift payment or an electronic gift certificate. Also, an electronic gift payment and an electronic gift certificate may be sent attached to the same e-card.

When a registered recipient of either an electronic gift payment or an electronic gift certificate, whether combined with an e-card or not, must follow a hyper-link to initiate the funds being credited into his account, additional benefits of the processing agent 130 arise. The recipient may donate the funds to a second recipient, registered or unregistered, by merely forwarding the notice of funds availability to another entity via email. When the second recipient follows the link and identifies himself to the processing agent 130, and registers if necessary, he can then receive the funds or gift certificate donated by the original donor.

If, as discussed above, processing agent 130 accepts a user into the enclosed community 201 even though that user's account is not electronically debitable and/or creditable, processing of payments is different than described above. Debits to the registered user's account can be made by drafts prepared by processing agent 130 and drawn on the registered user's account. Credits to the account can be made by either checks or drafts drawn on the account associated with the processing agent 130 or another registered user. Additionally, debits and credits to the account may be made by wire transfer directed by the processing agent 130.

Other options for payment processing other than a DDA include credit cards associated with the registered user, debits and/or credits made via an automated teller machine (ATM) network or a point-of-sale (POS) network from and/or to the registered user's account, debits from and/or credits to a stored value account, and debits from and/or credits to lines of credit. A stored value account is an account, typically not maintained at a financial institution, that is pre-populated with a monetary value. Additionally, debits can be made by a debit authorization wherein funds availability is verified and funds are reserved.

When any of these optional payment methods are used, as will be recognized by one skilled in the art, processing agent 130 must obtain information from the registered user pertaining to each of these payment methods. This information can be obtained during registration at step 410, FIG. 4, or any time thereafter.

Processing agent 130 also may effect these optional payment methods for registered users whose demand deposit accounts are electronically debitable and/or creditable. In such a case, the registered user may specify which payment method to use on a per-transaction basis, or processing agent 130 may make this decision on a per-transaction basis. Or, processing agent 130 may make the decision to make all transactions involving a particular registered user by a particular payment method.

Processing agent 130 may charge a fee in providing each of the above-described services. This fee may be paid by the seller, donor, purchaser, or recipient. Or, the fee may be split between the seller and purchaser or the donor and recipient. For split fees, each party to a transaction may pay a different percent of the total fee charged by the processing agent 130. Fees may be levied when funds are debited from a purchaser account. That is, a fee in excess of a purchase price may be debited from a purchaser's account. Or, fees may be levied when funds are credited to a seller's account. That is, funds in an amount less than a purchase price may be credited to a seller's account. Fees may be levied when funds are debited from a donor's account. That is, an amount in excess of a donated amount may be debited from a donor's account. Or, fees may be levied when funds are credited to a recipient's account. That is, funds in an amount less than a donated amount may be credited to a recipient's account. Additionally, fees may vary depending upon the amount of a transaction, a volume of transactions associated with a registered user, the identity of a user, or the identity of a sponsor through which a user has registered.

As discussed above, processing agent 130 stores information in databases in memory 1170 relating to services performed by processing agent 130. It should be understood that each of the above-described databases may be the same single database. The unique user identifier associated with each registered user enables processing agent 130 to store information relating to each transaction to which each registered user has been a party. The stored information includes each step performed by, and each communication sent or received by, the processing agent 130 to render a service. This includes the dates and the times the steps and communications are performed. Thus, processing agent 130 maintains a history of the services utilized and transactions effected involving each registered user. This information may be stored in a single database for all transactions and/or in databases associated with each service offered by the processing agent 130. Processing agent 130 also records the status of all current transactions in memory 1170. At any time a registered user can contact processing agent 130 to obtain information on past or current transactions that user directed, or optionally of which that user was a party. The processing agent 130 may allow a user access to only a portion of the information stored. The amount of information made available to a user may be varied dependent upon the identity of the user, the user's status as a payer or payee, or the type of transaction, among other factors.

It will also be recognized by those skilled in the art that, while the invention has been described above in terms of one or more preferred embodiments, it is not limited thereto. Various features and aspects of the above-described invention may be used individually or jointly. Further, although the invention has been described in the context of its implementation in a particular environment and for particular purposes, e.g. electronic payments, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

We claim:

1. A method for making a monetary gift, comprising:
    receiving, via a network, a request to send an electronic greeting card and to make an associated monetary gift in an amount, on behalf of a requesting donor to a designated recipient;
    processing the received request to generate the electronic greeting card including a notification of the monetary gift;
    transmitting, via the network, the generated electronic greeting card to the designated recipient;
    further transmitting, via the network, the transmitted electronic greeting card including a hyper-link and the notification of the monetary gift to a non-designated recipient;
    receiving, via activation of the hyper-link, information identifying the non-designated recipient;
    processing the received information identifying the non-designated recipient to determine if the non-designated recipient is a member of an enclosed community;
    if it is determined that the non-designated recipient is not a member of the enclosed community, transmitting a notice, via the network, to the non-designated recipient, that the non-designated recipient must become a member of the enclosed community before funds are directed to be credited to a deposit account; and
    if it is determined that the non-designated recipient is a member of the enclosed community, directing the crediting of the funds equal to the monetary gift amount to the deposit account;
    wherein the deposit account is at a financial institution and is associated with the non-designated recipient.

2. The method of claim 1, wherein:
    the request is received by, the received request is processed by and the generated electronic greeting card is transmitted by an electronic greeting card service; and
    the crediting of funds is directed by a payment service provider.

3. A method for making a monetary gift, comprising:
    receiving, via a network, a request to send an electronic greeting card and to make an associated monetary gift in an amount, on behalf of a requesting donor to a designated recipient;
    processing the received request to generate the electronic greeting card including a notification of the monetary gift;
    transmitting, via the network, the generated electronic greeting card to the designated recipient; and
    directing a crediting of funds equal to the monetary gift amount to a deposit account;
    wherein the request is received from an electronic greeting card service.

4. The method of claim 3, wherein the electronic greeting card is transmitted to the designated recipient at one of 1) a time subsequent to the directing of the crediting of the funds to the deposit account, 2) a time concurrent with the directing of the crediting of the funds to the deposit account, and 3) a time prior to the directing of the crediting of the funds to the deposit account.

5. The method of claim 3, wherein:
    the electronic greeting card includes a hyper-link;
    the funds are directed to be credited to the deposit account subsequent to an activation of the hyper-link; and
    the deposit account is at a financial institution.

6. The method of claim 5, further comprising:
    receiving, via activation of the hyper-link, information identifying the designated recipient;
    wherein the funds are directed to be credited to the deposit account subsequent to receipt of the information identifying the recipient; and
    wherein the deposit account is associated with the designated recipient.

7. The method of claim 3, wherein the electronic greeting card includes a hyper-link, and further comprising:
  receiving, via activation of the the hyperlink, information identifying the designated recipient;
  processing the received information identifying the designated recipient to determine if the designated recipient is a member of an enclosed community prior to the directing of the crediting of the funds to the deposit account; and
  if it is determined that the designated recipient is not a member of the enclosed community, transmitting a notice, via the network, to the designated recipient, that the designated recipient must become a member of the enclosed community before the funds are directed to be credited to the deposit account.

8. The method of claim 3, further comprising:
  processing the received request to determine if the designated recipient is a member of an enclosed community prior to processing the request to generate the electronic greeting card including the notification of the monetary gift;
  wherein, if it is determined that the designated recipient is not a member of the enclosed community, the transmitted electronic greeting card includes a notification that the recipient must become a member of the enclosed community before funds are directed to be credited to the deposit account.

9. A method for making a monetary gift, comprising:
  receiving, via a network, a request to send an electronic greeting card and to make an associated monetary gift in an amount, on behalf of a requesting donor to a designated recipient;
  processing the received request to generate the electronic greeting card including a notification of the monetary gift;
  transmitting, via the network, the generated electronic greeting card to the designated recipient;
  directing a crediting of funds equal to the monetary gift amount to a deposit account; and
  transmitting, via the network, the generated electronic greeting card to an electronic greeting card service prior to transmitting the electronic greeting card to the designated recipient.

10. The method of claim 9, wherein the electronic greeting card is transmitted to the designated recipient at one of 1) a time subsequent to the directing of the crediting of the funds to the deposit account, 2) a time concurrent with the directing of the crediting of the funds to the deposit account, and 3) a time prior to the directing of the crediting of the funds to the deposit account.

11. The method of claim 9, wherein:
  the electronic greeting card includes a hyper-link;
  the funds are directed to be credited to the deposit account subsequent to an activation of the hyper-link; and
  the deposit account is at a financial institution.

12. The method of claim 11, further comprising:
  receiving, via activation of the hyper-link, information identifying the designated recipient; and
  wherein the deposit account is associated with the designated recipient.

13. The method of claim 9, wherein the electronic greeting card includes a hyper-link, and further comprising:
  receiving, via activation of the hyper-link, information identifying the designated recipient;
  processing the received information identifying the designated recipient to determine if the designated recipient is a member of an enclosed community prior to the directing of the crediting of the funds to the deposit account; and
  if it is determined that the designated recipient is not a member of the enclosed community, transmitting a notice, via the network, to the designated recipient, that the designated recipient must become a member of the enclosed community before the funds are directed to be credited to the deposit account.

14. The method of claim 9, further comprising:
  processing the received request to determine if the designated recipient is a member of an enclosed community prior to processing the request to generate the electronic greeting card including the notification of the monetary gift;
  wherein, if it is determined that the designated recipient is not a member of the enclosed community, the transmitted electronic greeting card includes a notification that the recipient must become a member of the enclosed community before funds are directed to be credited to the deposit account.

15. The method of claim 9, wherein:
  the request is received by, the received request is processed by and the generated electronic greeting card is transmitted by an electronic greeting card service; and
  the crediting of funds is directed by a payment service provider.

16. A system for making a monetary gift, comprising:
  a communications port configured to receive a request to send an electronic greeting card and to make an associated monetary gift in an amount, on behalf of a requesting donor to a designated recipient, via a network; and
  a processor configured to process the received request to generate the electronic greeting card including a notification of the monetary gift;
  wherein:
  the communications port is further configured to transmit the electronic greeting card to the designated recipient via the network;
  the generated greeting card includes a hyper-link;
  the communications port is further configured to receive, via the network over the hyper-link, information identifying a non-designated recipient subsequent to a transmission of the electronic greeting card;
  the processor is further configured to process the information identifying the non-designated recipient to determine if the non-designated recipient of a member of the enclosed community;
  if it is determined that the non-designated recipient is not a member of the enclosed community, the processor is further configured to cause the communications port to transmit a notice to the non-designated recipient, via the network, that the non-designated recipient must become a member of the enclosed community before the funds are directed to be credited to a deposit account;
  if it is determined that the non-designated recipient is a member of the enclosed community, the processor is further configured to direct the funds equal to the monetary gift amount to be credited to a deposit account; and
  the deposit account is at a financial institution and is associated with the non-designated recipient.

17. The system of claim 16, wherein the request is received by an electronic greeting card service.

18. A system for making a monetary gift, comprising:
  a communications port configured to receive a request to send an electronic greeting card and to make an associated monetary gift in an amount, on behalf of a requesting donor to a designated recipient, via a network; and
a processor configured to process the received request to generate the electronic greeting card including a notification of the monetary gift;
wherein the communications port is further configured to transmit the electronic greeting card to the designated recipient via the network;
wherein the processor is further configured to direct funds equal to the monetary gift amount to be credited to a deposit account; and
wherein the request is received from an electronic greeting card service.

19. The system of claim 18, wherein the processor is further configured to cause the electronic greeting card to be transmitted to the recipient at one of 1) a time subsequent to the directing of the crediting of the funds to the deposit account, 2) a time concurrent with the directing of the crediting of the funds to the deposit account, and 3) a time prior to the directing of the crediting of the funds to the deposit account.

20. The system of claim 18, wherein:
the generated electronic greeting card includes a hyper-link;
the communications port is further configured to receive information via the network over the hyper-link;
the processor is further configured to direct the funds to be credited to the deposit account subsequent to receipt of the information over the hyper-link; and
the deposit account is at a financial institution.

21. The system of claim 20, wherein:
the information received via the network over the hyper-link identifies the designated recipient; and
the deposit account is associated with the designated recipient.

22. The system of claim 21, wherein:
the processor is further configured to (1) process the received information identifying the designated recipient to determine if the designated recipient is a member of an enclosed community prior to the directing of the crediting of the funds to the deposit account, and (2) if it is determined that the designated recipient is not a member of the enclosed community, cause the communications port to transmit a notice to the designated recipient that the designated recipient must become a member of the enclosed community before the funds are directed to be credited to the deposit account.

23. The system of claim 18, wherein:
the processor is further configured to process the request to determine if the designated recipient is a member of an enclosed community prior to generating the electronic greeting card including the notification of the monetary gift; and
if it is determined that the designated recipient is not a member of the enclosed community, the generated electronic greeting card includes a notification that the designated recipient must become a member of the enclosed community before the funds are directed to be credited to the deposit account.

24. The system of claim 18, wherein the request is received by an electronic greeting card service.

25. A system for making a monetary gift, comprising:
a communications port configured to receive a request to send an electronic greeting card and to make an associated monetary gift in an amount, on behalf of a requesting donor to a designated recipient, via a network; and
a processor configured to process the received request to generate the electronic greeting card including a notification of the monetary gift;
wherein the communications port is further configured to transmit the electronic greeting card to the designated recipient via the network; and
wherein the processor is further configured to direct funds equal to the monetary gift amount to be credited to a deposit account.

26. The system of claim 25, wherein the processor is further configured to cause the electronic greeting card to be transmitted to the recipient at one of 1) a time subsequent to the directing of the crediting of the funds to the deposit account, 2) a time concurrent with the directing of the crediting of the funds to the deposit account, and 3) a time prior to the directing of the crediting of the funds to the deposit account.

27. The system of claim 25, wherein:
the generated electronic greeting card includes a hyper-link;
the communications port is further configured to receive information via the network over the hyper-link;
the processor is further configured to direct the funds to be credited to the deposit account subsequent to receipt of the information over the hyper-link; and
the deposit account is at a financial institution.

28. The system of claim 27, wherein:
the information received via the network over the hyper-link identifies the designated recipient; and
the deposit account is associated with the designated recipient.

29. The system of claim 28, wherein:
the processor is further configured to (1) process the received information identifying the designated recipient to determine if the designated recipient is a member of an enclosed community prior to the directing of the crediting of the funds to the deposit account, and (2) if it is determined that the designated recipient is not a member of the enclosed community, cause the communications port to transmit a notice to the designated recipient that the designated recipient must become a member of the enclosed community before the funds are directed to be credited to the deposit account.

30. The system of claim 25, wherein:
the processor is further configured to process the request to determine if the designated recipient is a member of an enclosed community prior to generating the electronic greeting card including the notification of the monetary gift; and
if it is determined that the designated recipient is not a member of the enclosed community, the generated electronic greeting card includes a notification that the designated recipient must become a member of the enclosed community before the funds are directed to be credited to the deposit account.

* * * * *

UNITED STATES PATENT AND TRADEMARK OFFICE
CERTIFICATE OF CORRECTION

| | | |
|---|---|---|
| PATENT NO. | : 7,502,749 B2 | Page 1 of 1 |
| APPLICATION NO. | : 09/849979 | |
| DATED | : March 10, 2009 | |
| INVENTOR(S) | : Ravi Ganesan et al. | |

It is certified that error appears in the above-identified patent and that said Letters Patent is hereby corrected as shown below:

In the drawings, Sheet 25, Fig. 19C should be replaced with the drawing below, inserting the label -- FROM STEP 1910 FIGURE 19A --; and correcting "FROM STEP 1925 FIGURE 19A" to read -- TO STEP 1925 FIGURE 19A --.

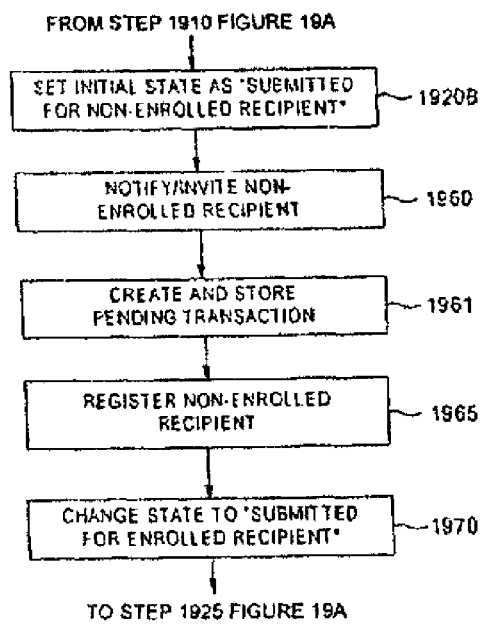

Figure 19C

Signed and Sealed this

Sixteenth Day of June, 2009

JOHN DOLL
*Acting Director of the United States Patent and Trademark Office*